US00RE49689E

(19) United States
(12) Reissued Patent
Itabashi

(10) Patent Number: US RE49,689 E
(45) Date of Reissued Patent: Oct. 10, 2023

(54) DEVELOPING CARTRIDGE CAPABLE OF RELEASING MESHING BETWEEN GEAR AND RACK GEAR

(71) Applicant: BROTHER KOGYO KABUSHIKI KAISHA, Nagoya (JP)

(72) Inventor: Nao Itabashi, Nagoya (JP)

(73) Assignee: BROTHER KOGYO KABUSHIKI KAISHA, Nagoya (JP)

(21) Appl. No.: 16/988,029

(22) Filed: Aug. 7, 2020

Related U.S. Patent Documents

Reissue of:
(64) Patent No.: 10,042,282
Issued: Aug. 7, 2018
Appl. No.: 15/715,979
Filed: Sep. 26, 2017

(30) Foreign Application Priority Data

Dec. 28, 2016 (JP) ..... 2016-256106

(51) Int. Cl.
*G03G 15/08* (2006.01)
*G03G 21/18* (2006.01)
*G03G 21/16* (2006.01)

(52) U.S. Cl.
CPC ..... *G03G 15/0863* (2013.01); *G03G 21/1647* (2013.01); *G03G 21/1652* (2013.01);
(Continued)

(58) Field of Classification Search
CPC ..... G03G 15/065; G03G 15/0863; G03G 15/087; G03G 15/0872; G03G 21/1647;
(Continued)

(56) References Cited

U.S. PATENT DOCUMENTS 8,805,210 B2 * 8/2014 Mushika ..... G03G 21/1896 399/12
2004/0052559 A1 3/2004 Jeong et al.
(Continued)

FOREIGN PATENT DOCUMENTS

CN 201229469 Y * 4/2009
JP 2011-215374 A 10/2011
(Continued)

OTHER PUBLICATIONS

English translation of CN-201229469-Y retrieved from EPO's Espacenet website.*
(Continued)

*Primary Examiner* — Peter C English
(74) *Attorney, Agent, or Firm* — Merchant & Gould P.C.

(57) ABSTRACT

A developing cartridge includes: a casing; a developing roller; a developing electrode; a gear; a rack gear including a protrusion; and a cam having first and second cam surfaces. The rack gear meshes with the gear and is movable in a direction from one end toward another end of the casing. The cam is movable from a first position to a second position. The first cam surface of the cam at the first position contacts the protrusion, and causes the cam to move to the second position as the rack gear moves in the direction in a state where the first cam surface is in contact with the protrusion. A second cam surface moves the developing electrode in a direction away from the cam different from moving directions of the rack gear and the cam while contacting the developing electrode as the cam moves to the second position.

35 Claims, 13 Drawing Sheets

(52) U.S. Cl.
CPC ..... *G03G 21/1867* (2013.01); *G03G 21/1875* (2013.01); *G03G 21/1896* (2013.01); *G03G 2215/0695* (2013.01); *G03G 2221/166* (2013.01); *G03G 2221/1657* (2013.01); *G03G 2221/1892* (2013.01)

(58) Field of Classification Search
CPC ..... G03G 21/1652; G03G 21/1867; G03G 21/1871; G03G 21/1875; G03G 21/1896; G03G 2215/0695; G03G 2221/1657; G03G 2221/166; G03G 2221/1892
See application file for complete search history.

(56) References Cited

U.S. PATENT DOCUMENTS

| | | | | |
|---|---|---|---|---|
| 2011/0243578 | A1 | 10/2011 | Ukai et al. | |
| 2013/0051813 | A1* | 2/2013 | Itabashi et al. .... | G03G 21/1871 399/12 |
| 2013/0051816 | A1 | 2/2013 | Itabashi | |
| 2015/0086222 | A1* | 3/2015 | Shimizu ..... | G03G 21/1896 399/12 |

FOREIGN PATENT DOCUMENTS

| | | | | |
|---|---|---|---|---|
| JP | 2013-037098 | | 2/2013 | |
| JP | 2013-037098 | A | 2/2013 | |
| JP | 2013-054053 | A | 3/2013 | |
| WO | WO-2014141444 | A1 * | 9/2014 | ..... G03G 15/065 |

OTHER PUBLICATIONS

English translation of WO-2014141444-A1 retrieved using Google Patents.*

Notification of First Office Action with Search Report issued in corresponding Chinese Patent Application No. 201710873925.0; dated May 26, 2021.

International Search Report and Written Opinion issued in related International Patent Application No. PCT/JP2017/034283, dated Dec. 12, 2017.

* cited by examiner

DEVELOPING CARTRIDGE CAPABLE OF RELEASING MESHING BETWEEN GEAR AND RACK GEAR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This application *is a reissue of U.S. Pat. No. 10,042,282, which was filed as U.S. patent application Ser. No. 15/715,979 and filed on Sep. 26, 2017, and which* claims priority from Japanese Patent Application No. 2016-256106 filed Dec. 28, 2016. The entire content of the *Japanese* priority application is incorporated herein by reference.

TECHNICAL FIELD

The present disclosure relates to a developing cartridge including a developing roller.

BACKGROUND

Conventionally, a developing cartridge includes a detection protrusion for moving an actuator positioned at a main body casing of an image forming apparatus. The detection protrusion has a gear. The detection protrusion is rotatable around a shaft. The actuator is moved by the detection protrusion pushing the actuator during rotation of the gear. Further, the gear has a toothless portion. In a case where the toothless portion faces a drive gear that transmits the drive force to the gear, meshing between the gear and the drive gear is released. As a result, the rotation of the gear stops. As the rotation of the gear stops, the rotation of the detection protrusion also stops.

SUMMARY

Meanwhile, in the above-described developing cartridge, it has been desired to release meshing between a gear other than the gear and the drive gear.

In view of the foregoing, it is an object of the disclosure to provide a developing cartridge capable of releasing meshing between a gear other than the gear and the drive gear.

In order to attain the above and other objects, according to one aspect, the disclosure provides a developing cartridge including: a casing; a developing roller; a developing electrode; a gear; a rack gear; and a cam. The casing is configured to accommodate toner therein. The developing roller is rotatable about a first axis extending in an axial direction. The developing roller is positioned at one end of the casing. The developing electrode is electrically connected to the developing roller. The gear is rotatable about a second axis parallel with the first axis. The rack gear meshes with the gear. The rack gear is movable in a direction from the one end of the casing toward another end of the casing opposite to the one end of the casing. The rack gear includes a protrusion. The cam is movable from a first position to a second position. The second position is farther away from the casing than the first position is from the casing in the axial direction. The cam has: a first cam surface; and a second cam surface. The first cam surface contacts the protrusion in a case where the cam is at the first position. The first cam surface causes the cam to move from the first position to the second position in a case where the rack gear moves in the direction from the one end of the casing toward the another end of the casing in a state where the first cam surface is in contact with the protrusion. The second cam surface moves the developing electrode in a direction away from the cam while contacting the developing electrode in a case where the cam moves from the first position to the second position. The direction away from the cam is a direction different from a moving direction of the rack gear and a moving direction of the cam.

According to another aspect, the disclosure provides a developing cartridge including: a casing; a developing roller; a gear; a developing electrode; a rack gear; a cover; and a cam. The casing is configured to accommodate toner therein. The developing roller is rotatable about a first axis extending in an axial direction. The developing roller is positioned at one end of the casing. The gear is rotatable about a second axis extending in the axial direction. The developing electrode is electrically connected to the developing roller. The rack gear is movable from the one end of the casing toward another end of the casing opposite to the one end of the casing. The rack gear is movable in a direction from the one end of the casing toward the another end of the casing in accordance with rotation of the gear by meshing with the gear. The rack gear includes a protrusion. The cover covers at least a portion of the rack gear. The cover has an opening through which the developing electrode is exposed to an outside. The cam is movable from a first position to the second position. The second position is farther away from the casing than the first position is from the casing in the axial direction. The cam has: a first cam surface; and a second cam surface. The first cam surface has a first edge and a second edge. The second edge is positioned farther away from the casing than the first edge is from the casing in the axial direction. The first cam surface is inclined so that the first edge is positioned downstream relative to the second edge in a moving direction of the protrusion. The first cam surface causes the cam to move from the first position to the second position by engaging with the protrusion. The first cam surface is positioned outside of a movement locus of the protrusion in a case where the cam is at the second position. The second cam surface is movable together with the first cam surface. The second cam surface is positioned farther away from the casing than the first cam surface is from the casing in the axial direction. The second cam surface is movable while contacting the developing electrode. The second cam surface has a fifth edge and a sixth edge. The sixth edge is positioned farther away from the casing than the fifth edge is from the casing in the axial direction. The second cam surface is inclined so as to protrude toward the opening in a direction from the sixth edge toward the fifth edge.

According to still another aspect, the disclosure provides a developing cartridge including: a casing; a developing roller; a gear; a rack gear; a cam; a spring; a cover; and a developing electrode. The casing is configured to accommodate toner therein. The developing roller is rotatable about a first axis extending in an axial direction. The developing roller is positioned at one end of the casing. The gear is rotatable about a second axis parallel with the first axis. The rack gear meshes with the gear. The rack gear is movable in a direction from the one end of the casing toward another end of the casing opposite to the one end of the casing. The cam is movable from a first position to a second position. The second position is farther away from the casing than the first position is from the casing in the axial direction. The cam includes a protrusion. The spring urges the cam from the first position toward the second position. The cover has an opening. The developing electrode is electrically connected to the developing roller. The developing electrode is movable together with the cam. The developing electrode has a second cam surface. The second cam surface has a fifth edge and a sixth edge. The sixth edge is positioned farther away from the casing than the fifth edge is from the casing in the axial direction. The second cam surface is inclined so as to protrude toward the opening in a direction from the sixth edge toward the fifth edge. The rack gear has: a first holding surface contacting the protrusion to hold the cam at the first position; and a second holding surface contacting the protrusion to hold the cam at the second position.

BRIEF DESCRIPTION OF THE DRAWINGS

The particular features and advantages of the embodiment(s) as well as other objects will become apparent from the following description taken in connection with the accompanying drawings, in which:

FIGS. 11A and 11B are a perspective view of each components of the developing cartridge according to the second embodiment, in which FIG. 11A is an exploded perspective view of the gear cover and components accommodated therein and FIG. 11B is a perspective view of a rack gear as viewed from a rack gear portion side thereof;

DETAILED DESCRIPTION

First Embodiment

Figure 1:
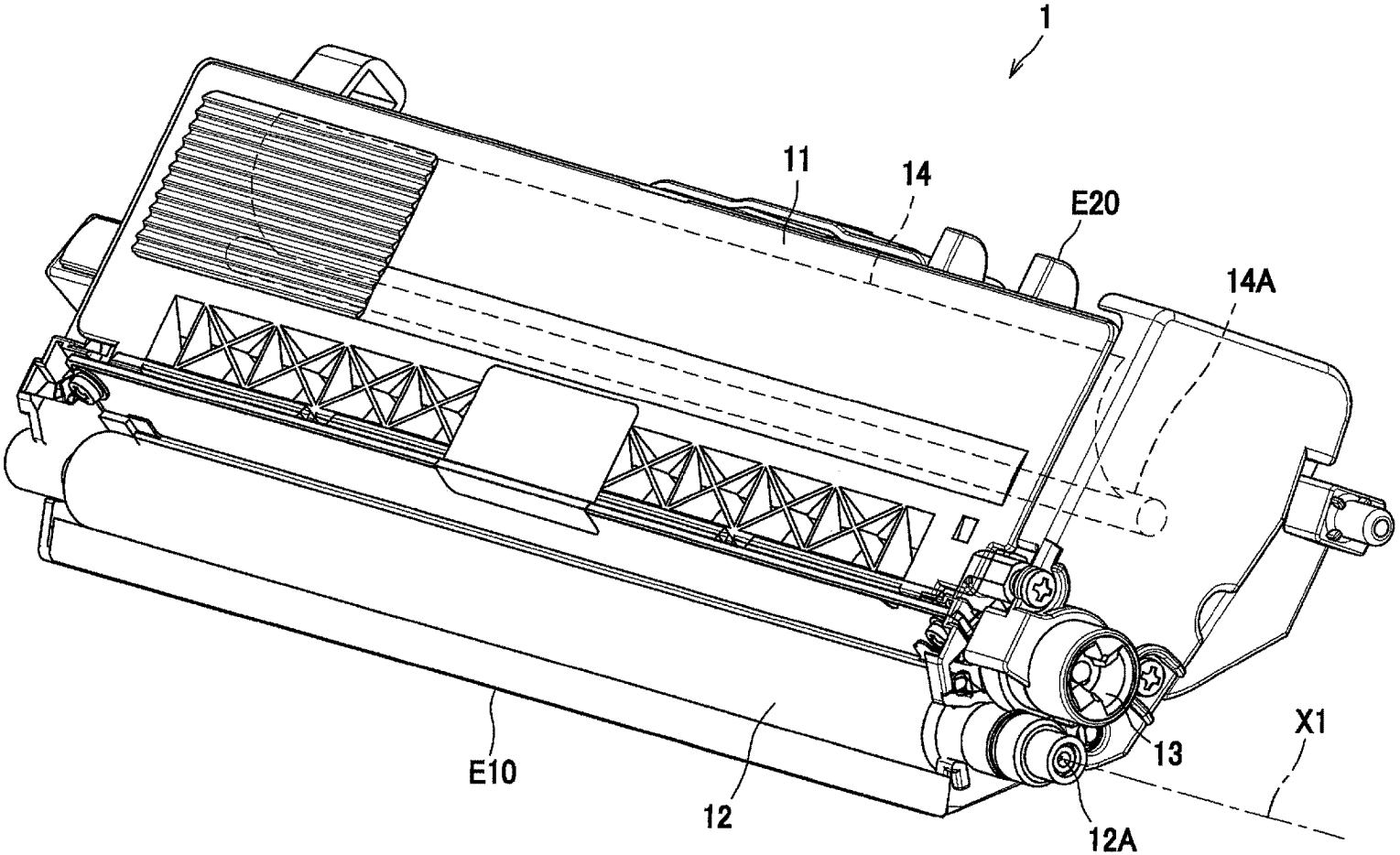
FIG. 1 is a perspective view of a developing cartridge according to a first embodiment as viewed from one end side thereof in an axial direction.

A developing cartridge according to a first embodiment will be described with reference to FIGS. 1 through 9B, wherein like parts and components are designated by the same reference numerals to avoid duplicating description.

As illustrated in FIG. 1, a developing cartridge 1 mainly includes a casing 11, a developing roller 12, a supply roller 15 (see FIG. 3), an agitator 14, and a coupling 13. The casing 11 accommodates toner therein. In the following description, an axial direction of the developing roller 12 will also be simply referred to as an "axial direction".

The developing roller 12 is a roller that supplies toner to an electrostatic latent image formed on a photosensitive member (not illustrated). The developing roller 12 is rotatable about a first axis X1 extending in the axial direction. The developing roller 12 has a shaft 12A extending in the axial direction. The developing roller 12 is positioned at one end E10 of the casing 11[in], *where the end E10 is defined relative to* a direction *that extends* from the shaft 12A toward a shaft 14A of the agitator 14 described later.

The supply roller 15 is a roller that supplies toner to the developing roller 12. The agitator 14 is a member that agitates the toner inside the casing 11.

The coupling 13 is a member that receives a driving force from outside. Specifically, in a case where an input member (not illustrated) capable of advancing and retracting is provided at a main body casing (not illustrated) of an image forming apparatus (not illustrated) and the input member advances and enters the coupling 13 to engage with the coupling 13 in a rotational direction, the driving force is inputted into the coupling 13 from the input member. The driving force inputted into the coupling 13 is transmitted to the developing roller 12 via a gear mechanism (not illustrated) and is also transmitted to the supply roller 15 and the agitator 14.

The coupling 13 is positioned at one end of the casing 11 in the axial direction. In other words, the coupling 13 is positioned opposite to a developing electrode 20 (see FIG. 2, described later), with the casing 11 interposed therebetween. That is, the coupling 13 is positioned at a side wall of the casing 11 opposite to a side wall 11A of the casing 11 at which the developing electrode 20 is positioned.

Figure 2:
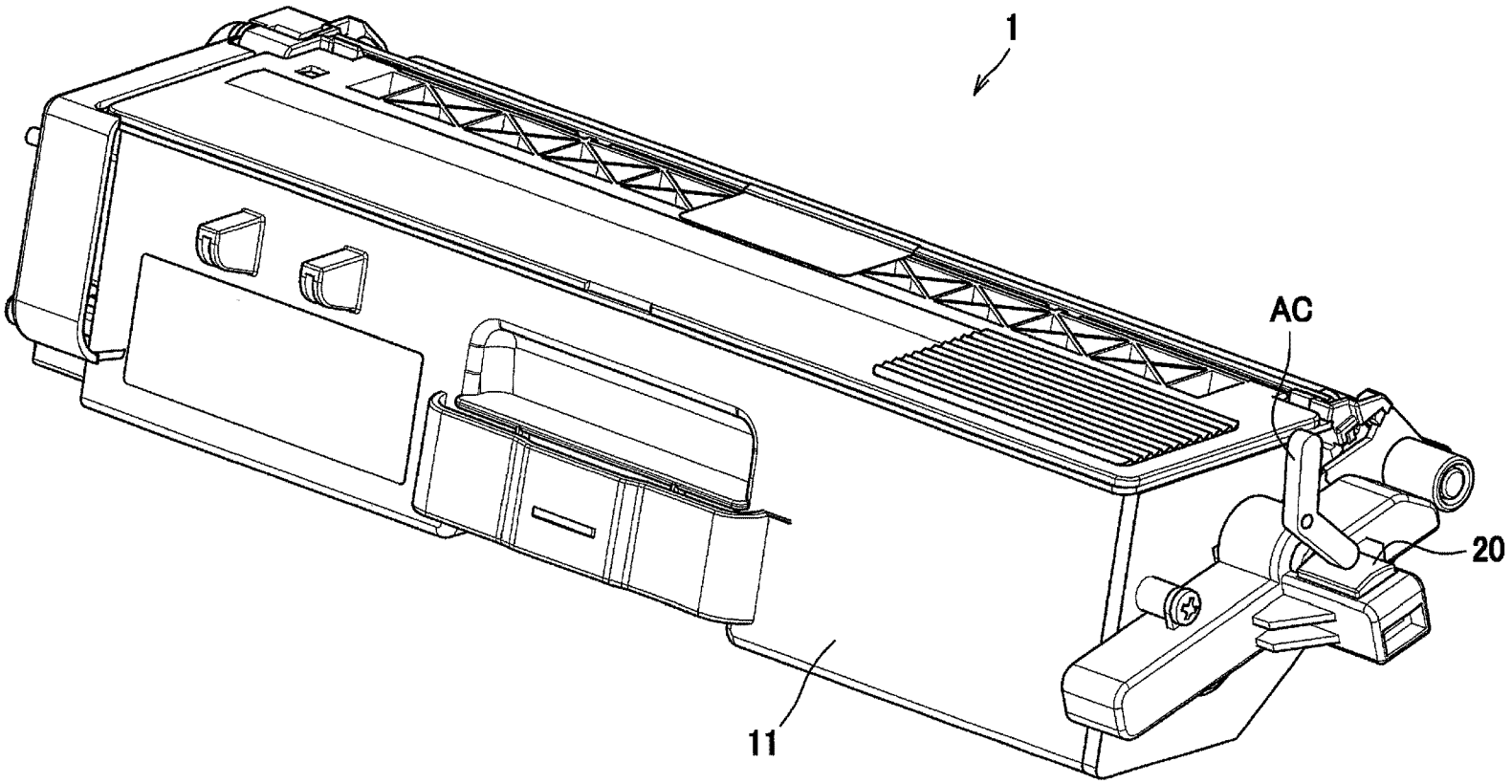
FIG. 2 is a perspective view of the developing cartridge according to the first embodiment as viewed from the other end side thereof in the axial direction.

As illustrated in FIG. 2, the developing cartridge 1 further includes a developing electrode 20. The developing electrode 20 is positioned at the other end of the casing 11 in the axial direction. The developing electrode 20 is provided for moving an actuator AC positioned at the main body casing of the image forming apparatus. The actuator AC is pivotally movably supported to the main body casing. The actuator AC is constituted by an electrically-conductive member. The image forming apparatus includes a power supply portion (not illustrated) and an optical sensor (not illustrated). The power supply portion and the optical sensor are positioned at the main body casing of the image forming apparatus. The power supply portion supplies electric power to the actuator AC. The optical sensor detects pivotal movement of the actuator AC.

As the driving force inputted into the coupling 13 is transmitted to the developing electrode 20 through the gear mechanism and the agitator 14 (see FIG. 1), the developing electrode 20 moves in an orthogonal direction orthogonal to the axial direction. Specifically, the orthogonal direction is a direction of lifting the actuator AC upward. In other words, the driving force inputted into the coupling 13 is transmitted from the one end to the other end of the casing 11 in the axial direction by the shaft 14A of the agitator 14.

Figure 3:
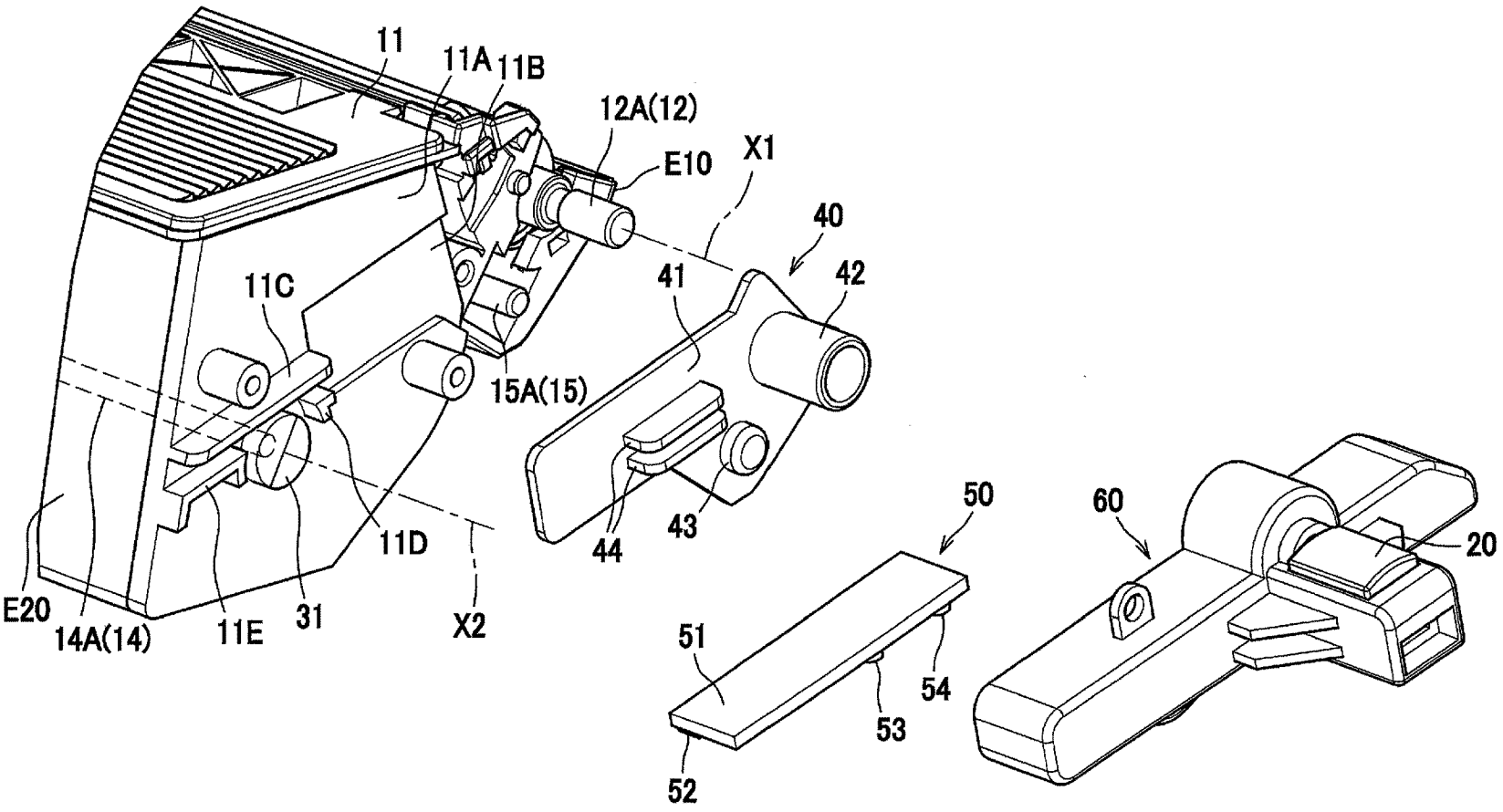
FIG. 3 is an exploded perspective view of components at the other end of the developing cartridge according to the first embodiment.
Figure 4:
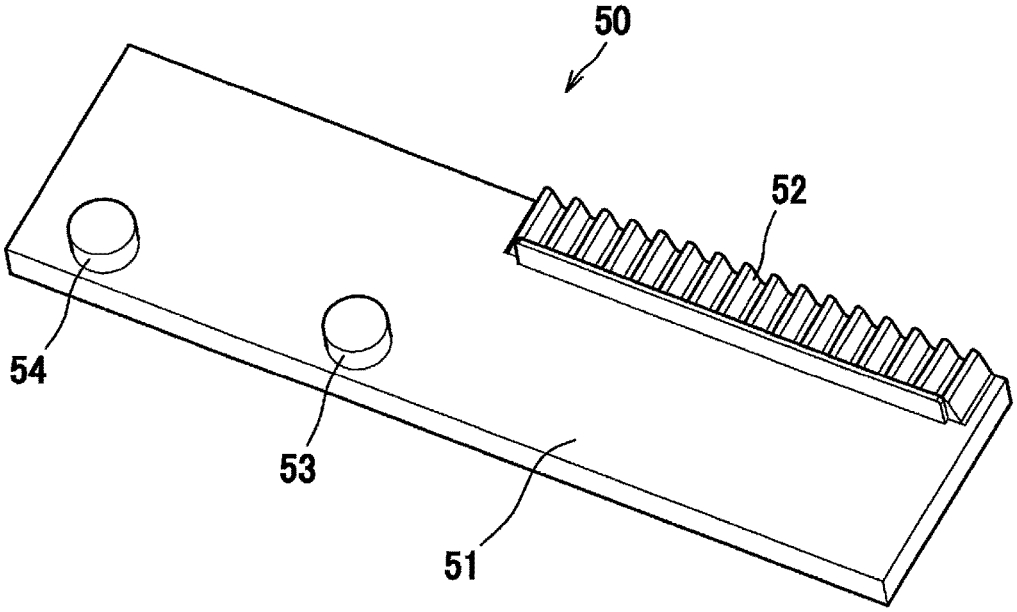
FIG. 4 is a perspective view of a rack gear of the developing cartridge according to the first embodiment as viewed from a rack gear portion side thereof.

As illustrated in FIG. 3, the developing cartridge 1 includes an agitator gear 31 as an example of a gear, a bearing 40, a rack gear 50, a gear cover 60 as an example of a cover, and the developing electrode 20. The agitator gear 31, the bearing 40, the rack gear 50, the gear cover 60, and the developing electrode 20 are positioned at the other end of the casing 11 in the axial direction. The casing 11, the agitator gear 31, the rack gear 50, and the gear cover 60 are made of a non-electrically-conductive resin.

The developing electrode 20 and the bearing 40 are made of an electrically-conductive material. Specifically, the developing electrode 20 and the bearing 40 are made of an electrically-conductive resin. The electrically-conductive resin is, for example, a polyacetal resin containing carbon powder.

The agitator gear 31 is mounted to the other end portion of the shaft 14A of the agitator 14. The agitator gear 31 is rotatable about a second axis X2 parallel with the first axis X1. The agitator gear 31 rotates together with the shaft 14A of the agitator 14. That is, the agitator gear 31 rotates together with the developing roller 12 by the driving force inputted into the coupling 13.

The bearing 40 is a member for rotatably supporting the shaft 12A of the developing roller 12 and a shaft 15A of the supply roller 15. The bearing 40 includes a plate-like portion 41, a first bearing portion 42, a second bearing portion 43, and two first guide portions 44.

The plate-like portion 41 is a plate-like portion that extends in the direction from the shaft 12A toward the shaft 14A. Specifically, the plate-like portion 41 extends from the shaft 12A of the developing roller 12 toward the agitator gear 31. The plate-like portion 41 is positioned, in the axial direction, between the side wall 11A at the other end of the casing 11 in the axial direction and the rack gear 50.

Specifically, the plate-like portion 41 is positioned in a recessed portion 11B positioned at an outer surface of the side wall 11A. Hence, an outer surface of the plate-like portion 41 and the outer surface of the side wall 11A are substantially flush with each other (see FIG. 7).

The first bearing portion 42 is a hollow cylindrical portion that rotatably supports the shaft 12A of the developing roller 12. The first bearing portion 42 protrudes from the plate-like portion 41 in a direction away from the casing 11 in the axial direction. Specifically, the first bearing portion 42 protrudes farther than the second bearing portion 43 in the direction away from the casing 11 in the axial direction.

The second bearing portion 43 is a hollow cylindrical portion that rotatably supports the shaft 15A of the supply roller 15. The second bearing portion 43 protrudes from the plate-like portion 41 in the direction away from the casing 11 in the axial direction. The second bearing portion 43 is positioned at a position closer to the agitator gear 31 than the first bearing portion 42 is to the agitator gear 31.

Each of the first guide portions 44 is a portion that movably supports the rack gear 50 in a direction from the one end E10 of the casing 11 (described later) toward the other end E20 of the casing 11. The two first guide portions 44 are provided so as to interpose the rack gear 50 therebetween. Each of the first guide portions 44 supports the rack gear 50. Each of the first guide portions 44 protrudes from the plate-like portion 41 in the direction away from the casing 11 in the axial direction. Each of the first guide portions 44 has a plate shape orthogonal to the plate-like portion 41. Each of the first guide portions 44 has a first length in the direction from the one end E10 of the casing 11 toward the other end E20 of the casing 11, and a second length in the axial direction. The first length is greater than the second length. Each of the first guide portions 44 is positioned at a position closer to the agitator gear 31 than the second bearing portion 43 is to the agitator gear 31.

The casing 11 includes a second guide portion 11C, a third guide portion 11D, and a fourth guide portion 11E. The second guide portion 11C, the third guide portion 11D, and the fourth guide portion 11E each movably support the rack gear 50 in the direction from the one end E10 of the casing 11 toward the other end E20 of the casing 11. The second guide portion 11C is positioned opposite to the third guide portion 11D and the fourth guide portion 11E with respect to the rack gear 50. The second guide portion 11C spans a range from the third guide portion 11D to the fourth guide portion 11E and extends in the direction from the one end E10 of the casing 11 toward the other end E20 of the casing 11.

The third guide portion 11D and the fourth guide portion 11E face a surface of the rack gear 50 facing the agitator gear 31. The third guide portion 11D is positioned at a position closer to the developing roller 12 than the agitator gear 31 is to the developing roller 12. The fourth guide portion 11E is positioned opposite to the third guide portion 11D with respect to the agitator gear 31 in the direction from the one end E10 of the casing 11 toward the other end E20 of the casing 11.

The rack gear 50 is movable in the direction from the one end E10 of the casing 11 toward the other end E20 of the casing 11 opposite to the one end E10. The rack gear 50 includes a main body portion 51, a rack gear portion 52, and a first protrusion 53 and a second protrusion 54 as an example of a protrusion.

The main body portion 51 has a rectangular plate shape that is elongated in the direction from the one end E10 of the casing 11 toward the other end E20 of the casing 11. The rack gear portion 52 has a plurality of gear teeth meshing with the agitator gear 31. The main body portion 51 extends in a moving direction of the rack gear 50. The rack gear portion 52 and the respective protrusions 53 and 54 protrude from a surface of the main body portion 51 facing the agitator gear 31. The rack gear 50 is configured to move in the direction from the one end E10 of the casing 11 toward the other end E20 of the casing 11 only while the rack gear portion 52 is meshed with the agitator gear 31. The rack gear 50 is configured to stop moving in a case where meshing between the rack gear portion 52 and the agitator gear 31 is released. That is, the rack gear 50 is movable in the direction from the one end E10 of the casing 11 toward the other end E20 of the casing 11 as the agitator gear 31 rotates.

The rack gear portion 52 is positioned at a downstream portion of the main body portion 51 in the moving direction of the rack gear 50 in an end portion of the main body portion 51 closer to the casing 11 in the axial direction. Specifically, the rack gear portion 52 is positioned at the main body portion 51 at a region from an end portion of the main body portion 51 closer to the agitator gear 31 in the moving direction of the rack gear 50 to a center portion of the main body portion 51 in the moving direction of the rack gear 50 (see FIG. 4).

The first protrusion 53 and the second protrusion 54 are positioned at positions different from the rack gear portion 52 in the moving direction of the rack gear 50. The first protrusion 53 and the second protrusion 54 are positioned at positions different from the rack gear portion 52 in the axial direction. Specifically, the first protruion 53 and the second protrusion 54 are positioned at the main body portion 51 at positions farther from the casing 11 than the rack gear portion 52 is from the casing 11 in the axial direction. Further, the first protrusion 53 and the second protrusion 54 are positioned at positions closer to the developing roller 12 than the rack gear portion 52 is to the developing roller 12 in the moving direction of the rack gear 50. More specifically, the first protrusion 53 is positioned in the vicinity of the center portion of the main body portion 51 in the moving direction of the rack gear 50. The second protrusion 54 is positioned at an end portion of the main body portion 51 closer to the developing roller 12 in the moving direction. The first protrusion 53 and the second protrusion 54 are capable of contacting a first cam surface 73A and a third cam surface 74A of a cam 70 (see FIG. 6, described later) in accordance with the movement of the rack gear 50.

Figure 5:
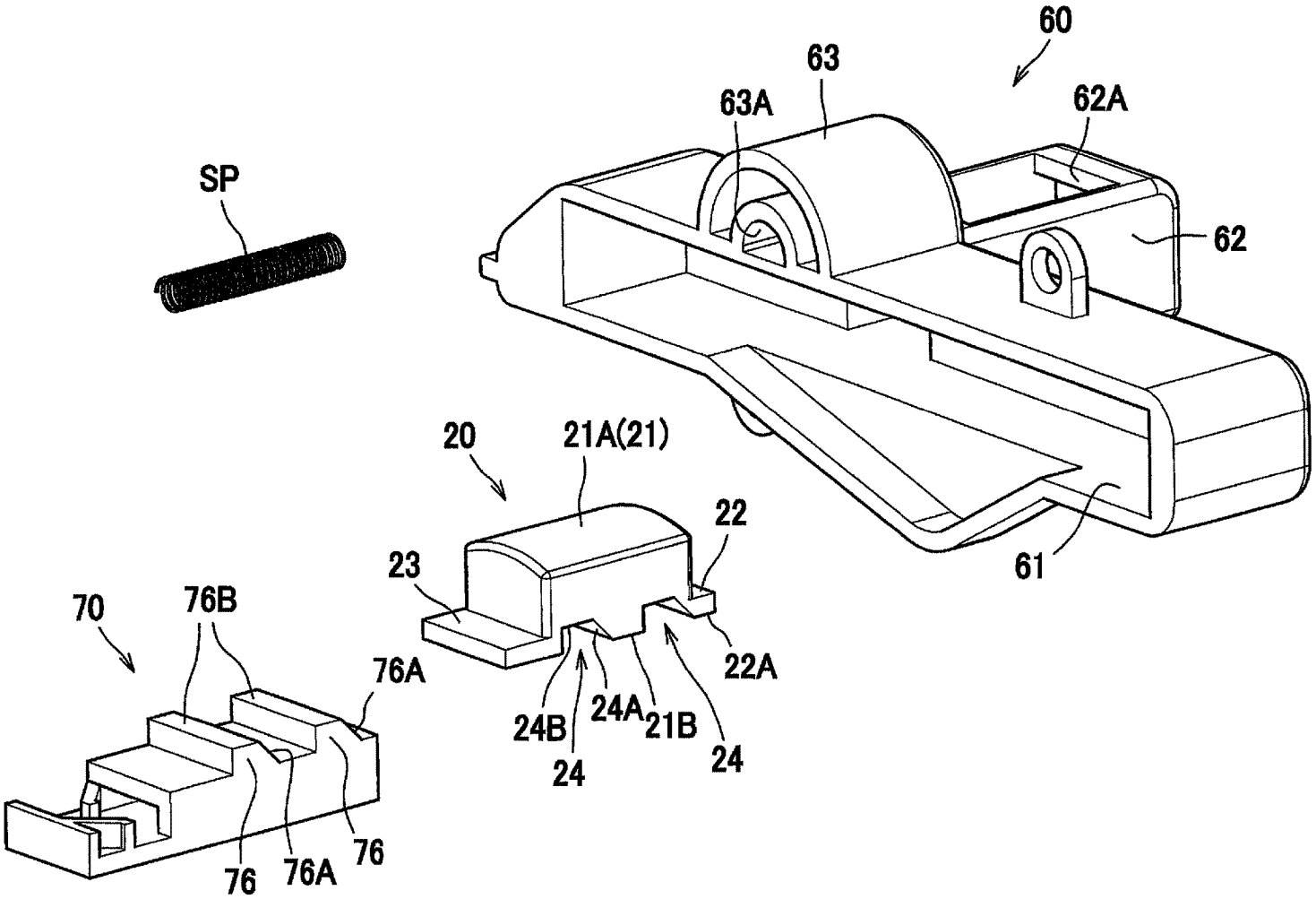
FIG. 5 is an exploded perspective view of a gear cover of the developing cartridge and components accommodated therein according to the first embodiment.

The gear cover 60 covers the agitator gear 31 and the rack gear 50. As illustrated in FIG. 5, the gear cover 60 covers the cam 70, the developing electrode 20, and a compression coil spring SP as an example of a spring. The cam 70 moves in the axial direction by receiving a force applied from the rack gear 50. The cam 70 is made of a non-electrically-conductive resin. The compression coil spring SP is made of an electrically-conductive material, specifically, metal.

The gear cover 60 includes a first cover portion 61, a second cover portion 62, and a third cover portion 63. The first cover portion 61 covers the rack gear 50 and the agitator gear 31. The second cover portion 62 covers the cam 70 and the developing electrode 20. The third cover portion 63 covers the compression coil spring SP. The first cover portion 61 is elongated in the direction from the one end E10 of the casing 11 toward the other end E20 of the casing 11 so that the rack gear 50 can be covered by the first cover portion 61 before, while, and after the rack gear 50 moves.

The second cover portion 62 protrudes away from the casing 11 in the axial direction. The second cover portion 62 protrudes away from a substantially center portion of the first cover portion 61[in], *where the substantially center portion of the first cover portion 61 is defined relative to* the direction from the one end E10 of the casing 11 toward the other end E20 of the casing 11. The second cover portion 62 has an internal space that is in communication with an internal space of the first cover portion 61. Further, the second cover portion 62 has an opening 62A through which the developing electrode 20 is exposed to outside.

The third cover portion 63 has a through-hole 63A penetrating the thickness of the third cover portion 63 in the axial direction. The compression coil spring SP is positioned inside the through-hole 63A. The third cover portion 63 is positioned at a position substantially the same as the second cover portion 62 in the direction from the one end E10 of the casing 11 toward the other end E20 of the casing 11. The third cover portion 63 protrudes from the first cover portion 61 in a direction away from the rack gear 50. The through-hole 63A is open toward the developing electrode 20.

Incidentally, in the present embodiment, a hollow portion of the third cover portion 63 is positioned between an outer peripheral surface of the third cover portion 63 and the through-hole 63A. However, the hollow portion may not be positioned between the outer peripheral surface of the third cover portion 63 and the through-hole 63A.

Figure 6:
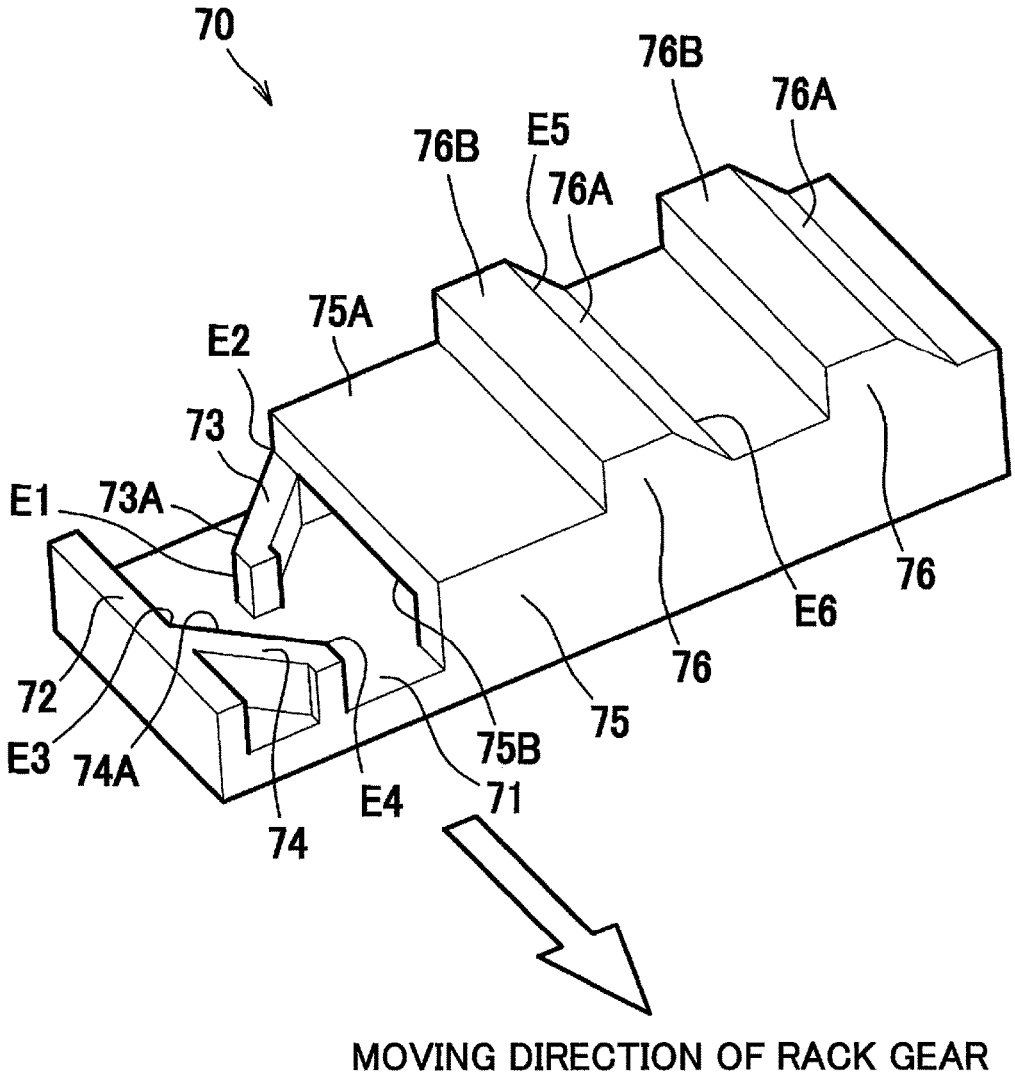
FIG. 6 is a perspective view of a cam of the developing cartridge according to the first embodiment.

The cam 70 is positioned in the second cover portion 62 of the gear cover 60 so as to be movable in the axial direction. The cam 70 is movable between a first position illustrated in FIG. 8A and a second position illustrated in FIG. 8B. The second position is farther away from the casing 11 than the first position is from the casing 11 in the axial direction. As illustrated in FIG. 6, the cam 70 includes a base portion 71, a rib 72, a first cam portion 73, a third cam portion 74, a protruding portion 75, and two second cam portions 76.

The base portion 71 is a plate-like portion orthogonal to a direction in that the rack gear 50 and the cam 70 face each other. The base portion 71 has a first length in the axial direction, and a second length in the direction from the one end E10 of the casing 11 toward the other end E20 of the casing 11. The first length is greater than the second length. The rib 72 protrudes toward the rack gear 50 from an end portion of the base portion 71 closer to the casing 11.

The first cam portion 73 and the third cam portion 74 are positioned between the rib 72 and the protruding portion 75. The first cam portion 73 and the third cam portion 74 protrude from the base portion 71 toward the rack gear 50.

The first cam portion 73 is positioned at a position different from the third cam portion 74 in the moving direction of the rack gear 50. Specifically, the first cam portion 73 is positioned farther away from the agitator gear 31 in the moving direction of the rack gear 50 than the third cam portion 74 is from the agitator gear 31. The first cam portion 73 diagonally extends from the protruding portion 75 toward the rib 72. That is, the first cam portion 73 diagonally extends downstream in the moving direction of the rack gear 50 from the protruding portion 75. The first cam portion 73 has one end connected to the protruding portion 75, and the other end separated from the rib 72. An interval between the other end of the first cam portion 73 and the rib 72 is greater than a diameter of each of the protrusions 53 and 54 of the rack gear 50.

The first cam portion 73 has a first cam surface 73A that is inclined relative to the moving direction of the rack gear 50. The first cam surface 73A is a surface for moving the cam 70 in the direction away from the casing 11 in the axial direction. The first cam surface 73A is configured to contact the protrusions 53 and 54 of the rack gear 50 in a case where the cam 70 is at the first position. The first cam surface 73A is configured to move the cam 70 from the first position to the second position. Specifically, in a case where the rack gear 50 moves in the direction from the one end E10 of the casing 11 toward the other end E20 of the casing 11 in a state where the first cam surface 73A is in contact with the first protrusion 53 or the second protrusion 54, the first cam surface 73A causes the cam 70 to move from the first position toward the second position. In other words, the first cam surface 73A causes to move the cam 70 from the first position to the second position by engaging with the protrusions 53 and 54. In a case where the cam 70 is at the second position, the first cam surface 73A is positioned outside of a movement locus of the protrusions 53 and 54.

The first cam surface 73A is inclined so that a downstream edge of the first cam surface 73A in the moving direction of the rack gear 50 is positioned closer to the casing 11 than an upstream edge of the first cam surface 73A in the moving direction of the rack gear 50 is to the casing 11 in the axial direction. Specifically, the first cam surface 73A has a first edge E1, and a second edge E2. The second edge E2 is positioned farther away from the casing 11 than the first edge E1 is from the casing 11 in the axial direction. The first cam surface 73A is inclined so that the first edge E1 is positioned downstream relative to the second edge E2 in the moving direction of the rack gear 50.

The third cam portion 74 diagonally extends from a substantially center portion of the rib 72 in the direction from the one end E10 of the casing 11 toward the other end E20 of the casing 11 toward the protruding portion 75. That is, the third cam portion 74 diagonally extends downstream in the moving direction of the rack gear 50 from the substantially center portion of the rib 72. The third cam portion 74 has one end connected to the rib 72, and the other end separated from the protruding portion 75. An interval between the other end of the third cam portion 74 and the protruding portion 75 is greater than the diameter of each of the protrusions 53 and 54 of the rack gear 50.

The third cam portion 74 has a third cam surface 74A that is inclined relative to the moving direction of the rack gear 50. The third cam surface 74A is a surface for moving the cam 70 in a direction toward the casing 11 in the axial direction. The third cam surface 74A is configured to contact the protrusions 53 and 54 of the rack gear 50 in a case where the cam 70 is at the second position. In other words, the third cam surface 74A is positioned within the movement locus of the protrusions 53 and 54 in a case where the cam 70 is at the second position. The third cam surface 74A is configured to move the cam 70 from the second position toward the first position. Specifically, in a case where the rack gear 50 moves in the direction from the one end E10 of the casing 11 toward the other end E20 of the casing 11 in a state where the third cam surface 74A is in contact with the first protrusion 53 or the second protrusion 54, the third cam surface 74A causes the cam 70 to move from the second position toward the first position.

The third cam surface 74A is positioned downstream relative to the first cam surface 73A in the moving direction of the rack gear 50. The third cam surface 74A is positioned at a position different from the first cam surface 73A in a moving direction of the cam 70. Specifically, the first cam surface 73A is positioned farther away from the casing 11 than the third cam surface 74A is from the casing 11 in the axial direction.

The third cam surface 74A is inclined so that a downstream edge of the third cam surface 74A in the moving direction of the rack gear 50 is positioned farther away from the casing 11 than an upstream edge of the third cam surface 74A in the moving direction of the rack gear 50 is from the casing 11 in the axial direction. Specifically, the third cam surface 74A has a third edge E3, and a fourth edge E4. The fourth edge E4 is positioned farther away from the casing 11 than the third edge E3 is from the casing 11 in the axial direction. The third cam surface 74A is inclined so that the fourth edge E4 is positioned downstream relative to the third edge E3 in the moving direction of the rack gear 50.

The protruding portion 75 protrudes toward the developing electrode 20 from a portion of the base portion 71 farther from the casing 11. The protruding portion 75 protrudes toward the first cam portion 73 from one end of the base portion 71 farther from the casing 11 in the axial direction. The protruding portion 75 has a rectangular-shaped through-hole 75B penetrating the thickness of the protruding portion 75 in the axial direction.

Each of the second cam portions 76 protrudes toward the developing electrode 20 from a surface of the protruding portion 75 that faces the developing electrode 20. Hereinafter, the surface of the protruding portion 75 that faces the developing electrode 20 will also be referred to as "first surface 75A". Each of the second cam portions 76 is positioned spaced apart from each other in the axial direction. Each of the second cam portions 76 is positioned away from one end and the other end of the protruding portion 75 in the axial direction. Each of the second cam portions 76 has a second cam surface 76A inclined relative to the axial direction, and a support surface 76B for supporting the developing electrode 20.

The second cam surface 76A is a surface for moving the developing electrode 20 in a direction away from the cam 70 in a case where the cam 70 moves from the first position to the second position. In a case where the cam 70 moves from the first position to the second position, the second cam surface 76A contacts the developing electrode 20. The direction away from the cam 70 is a direction different from the moving direction of the rack gear 50 and the moving direction of the cam 70. The second cam surface 76A is movable together with the first cam surface 73A. The second cam surface 76A is positioned farther away from the casing 11 than the first cam surface 73A is from the casing 11 in the axial direction.

The second cam surface 76A is inclined toward the first cam surface 75A. A downstream edge of the second cam surface 76A in the direction away from the casing 11 in the axial direction is positioned closer to the first surface 75A than an upstream edge of the second cam surface 76A in the direction away from the casing 11 in the axial direction is to the first surface 75A. Specifically, the second cam surface 76A has a fifth edge E5, and a sixth edge E6. The sixth edge E6 is positioned farther away from the casing 11 than the fifth edge E5 is from the casing 11 in the axial direction. The second cam surface 76A is inclined so as to protrude toward the developing electrode 20 in a direction from the sixth edge E6 toward the fifth edge E5. In other words, the second cam surface 76A is inclined so as to protrude toward the opening 62A in the direction from the sixth edge E6 toward the fifth edge E5. The support surface 76B extends parallel with the first surface 75A.

Referring back to FIG. 5, the developing electrode 20 is movably supported at the second cover portion 62 of the gear cover 60. The developing electrode 20 is positioned at the first surface 75A of the cam 70. The developing electrode 20 is movable between a third position and a fourth position. The fourth position is farther away from the cam 70 than the third position is from the cam 70. The developing electrode 20 has a substantially rectangular parallelepiped electrode portion 21, a first flange portion 22, and a second flange portion 23. The first flange portion 22 and the second flange portion 23 protrude, in a direction away from the electrode portion 21 in the axial direction, from an end portion of the electrode portion 21 opposite to a second surface 21A (described later) of the electrode portion 21.

The electrode portion 21 is positioned so as to protrude through the opening 62A of the second cover portion 62 in the direction away from the cam 70 (see FIG. 3). Specifically, a protruding amount of the electrode portion 21 from the opening 62A is greater in a case where the developing electrode 20 is at the fourth position than in a case where the developing electrode 20 is at the third position.

The electrode portion 21 has a surface opposite to a surface of the electrode portion 21 facing the cam 70. Hereinafter, the surface of the electrode portion 21 opposite to the surface of the electrode portion 21 facing the cam 70 will also be referred to as "second surface 21A". The second surface 21A is an arcuate curved surface that protrudes in the direction away from the cam 70 in a cross-section orthogonal to the axial direction. The electrode portion 21 has two recessed portions 24 into which the two second cam portions 76 of the cam 70 can enter, respectively. The recessed portions 24 are configured to be recessed from the surface of the electrode portion 21 facing the cam 70 in the direction away from the cam 70. Each of the recessed portions 24 has a fourth cam surface 24A contacting the second cam surface 76A of the second cam portion 76, and a bottom surface 24B extending parallel with the first surface 75A. The fourth cam surface 24A extends parallel with the second cam surface 76A.

Of the surface of the electrode portion 21 facing the cam 70, a portion positioned between the two recessed portions 24 serves as a supported surface 21B. In a case where the developing electrode 20 is at the fourth position, the supported surface 21B is supported at one of the second cam portions 76 of the cam 70 closer to the casing 11. Further, a surface of the first flange portion 22 facing the cam 70 serves as a supported surface 22A. In a case where the developing electrode 20 is at the fourth position, the supported surface 22A is supported at the other of the second cam portions 76 of the cam 70 positioned farther from the casing 11. Incidentally, in a case where the developing electrode 20 is at the third position, at least one of the surfaces of the developing electrode 20 facing the cam 70 (i.e. the surfaces including the supported surfaces 21B and 22A) and the bottom surface 24B of each recessed portions 24 may be supported by the cam 70.

Figure 7:
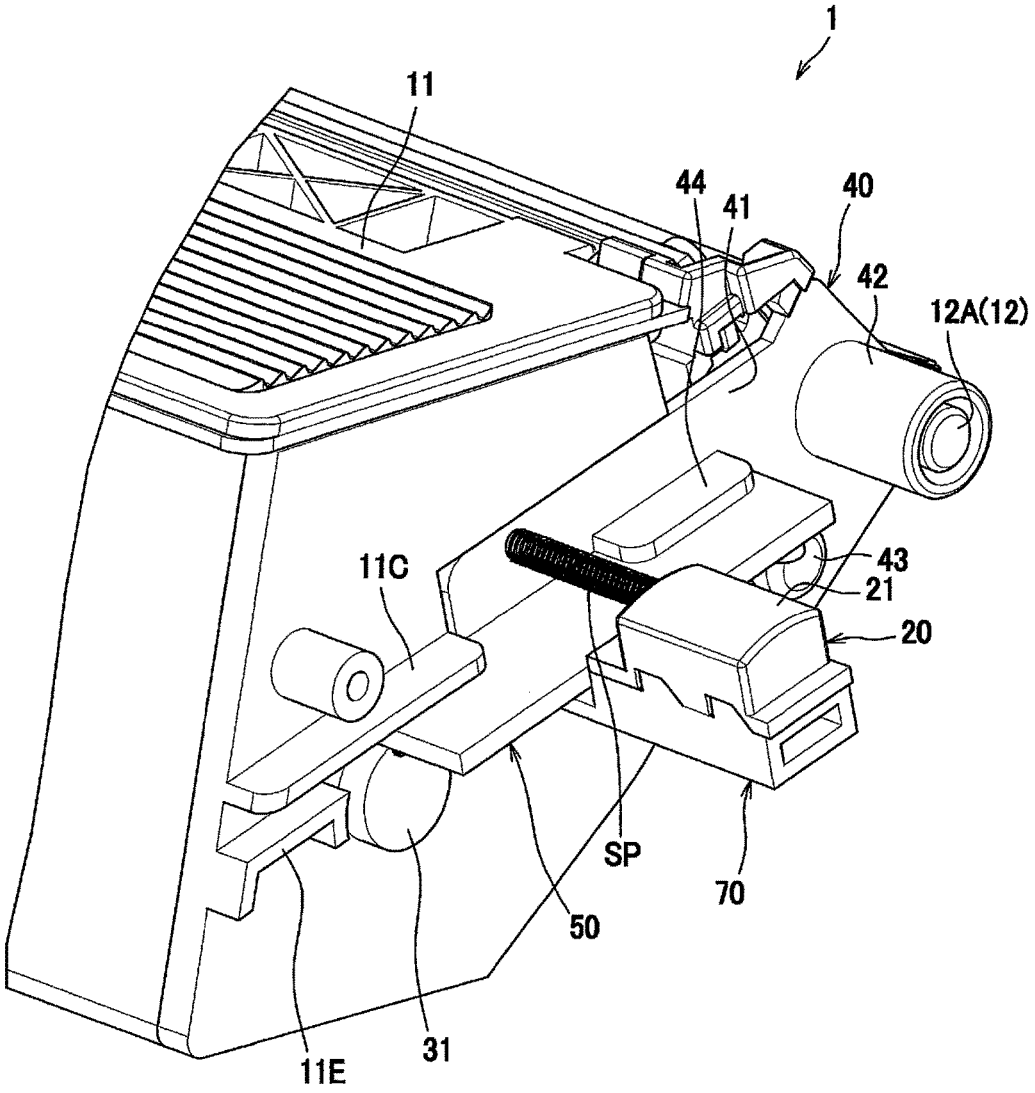
FIG. 7 is a perspective view illustrating a structure at the other end side of the developing cartridge according to the first embodiment, from which the gear cover is omitted.

As illustrated in FIG. 7, the compression coil spring SP is positioned between the electrode portion 21 of the developing electrode 20 and the plate-like portion 41 of the bearing 40 in the axial direction. Specifically, the compression coil spring SP has one end in contact with the electrode portion 21 of the developing electrode 20, and the other end opposite to the one end of the compression coil spring SP and in contact with the plate-like portion 41 of the bearing 40. Thus, the developing electrode 20 is electrically connected to the developing roller 12 and the supply roller 15 through the compression coil spring SP and the bearing 40.

More specifically, the compression coil spring SP is in contact with a surface of the electrode portion 21 closer to the casing 11. Accordingly, in a case where the developing electrode 20 is at the third position, in a case where the developing electrode 20 moves from the third position to the fourth position, and in a case where the developing electrode 20 is at the fourth position, the compression coil spring SP keeps in contact with the electrode portion 21. That is, the developing electrode 20 is movable while the developing electrode 20 is in contact with the compression coil spring SP.

The compression coil spring SP has a length in a case where the one end of the compression coil spring SP is in contact with the developing electrode 20 and the other end of the compression coil spring SP is in contact with the bearing 40, and a natural length. The length is shorter than the natural length. Further, the compression coil spring SP is positioned opposite to the cam 70 with respect to the rack gear 50. The compression coil spring SP is positioned between the first guide portion 44 and the second guide portion 11C in the direction from the one end E10 of the casing 11 toward the other end E20 of the casing 11.

Next, operations and effects of each member constituting the developing cartridge 1 will be described in detail. In a case where the developing cartridge 1 is in a brand-new state, the rack gear 50 is positioned at a position closest to the one end E10 of the casing 11, and the cam 70 is positioned at a position closest to the casing 11. With this arrangement, the developing electrode 20 is placed at the third position.

As illustrated in FIG. 2, in a case where the developing cartridge 1 in the brand-new state is attached to the main body casing of the image forming apparatus, the second surface 21A of the developing electrode 20 contacts an electrode provided at the actuator AC. Thus, the developing bias is supplied from a power source (not illustrated) of the image forming apparatus to the developing electrode 20 through the electrode of the actuator AC.

Thereafter, as a driving force is inputted from a driving source (not illustrated) at the main body casing to the coupling 13 of the developing cartridge 1, the driving force is transmitted to the shaft 14A of the agitator 14 through the coupling 13 and the gear mechanism (not illustrated). The driving force transmitted to the shaft 14A of the agitator 14 is transmitted to the agitator gear 31 as illustrated in FIG. 3.

Figures 8A, 8B, 8C, 8D:
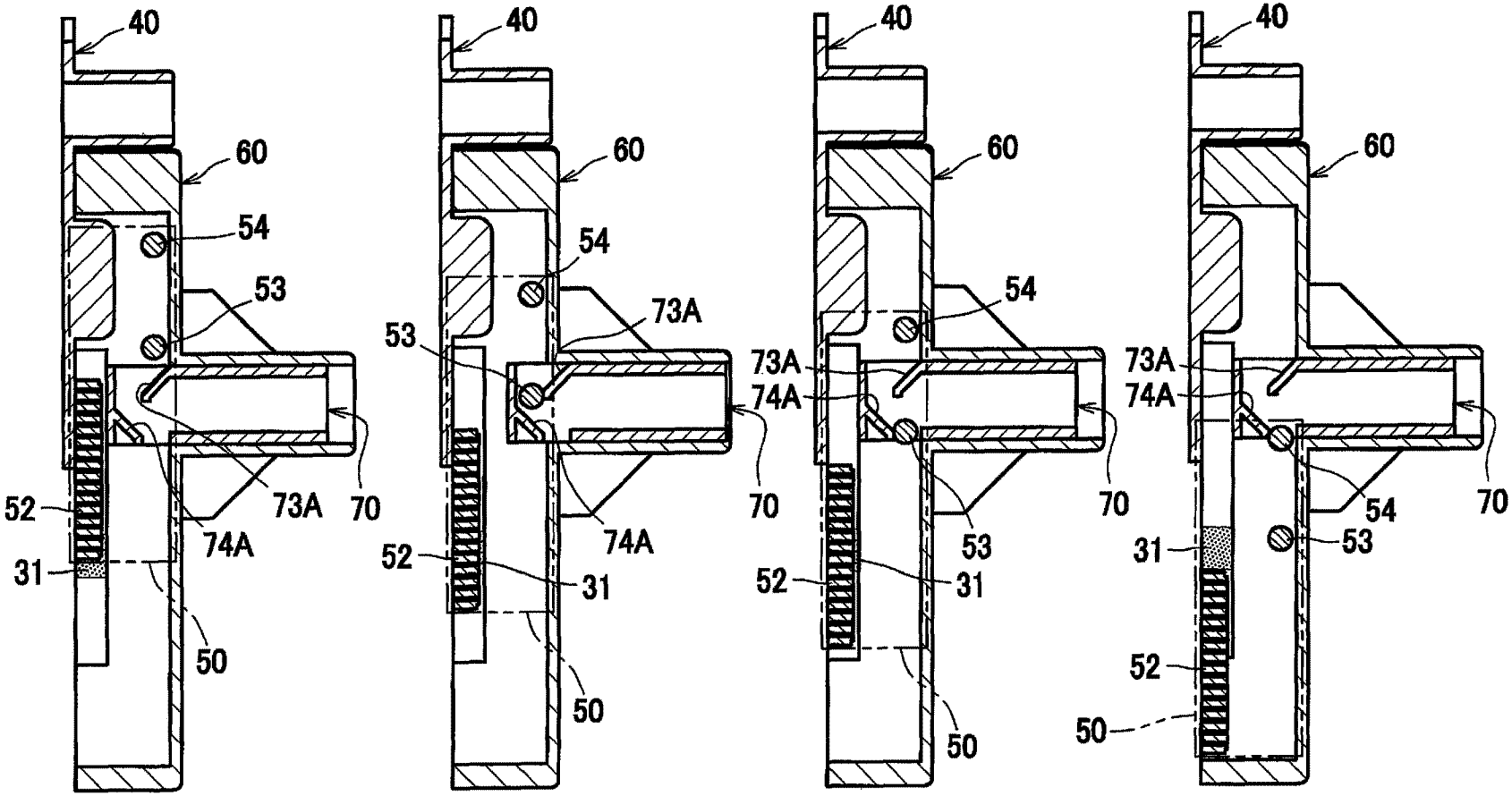
FIGS. 8A through 8D are cross-sectional views of an engaging portion between the rack gear and the cam taken along a plane orthogonal to an up-down direction according to the first embodiment, illustrating movements of the rack gear and the cam.

As the agitator gear 31 to which the driving force is transmitted rotates, the rack gear 50 moves in the direction from the one end E10 of the casing 11 toward the other end E20 of the casing 11. As illustrated in the sequence of FIGS. 8A and 8B, in a case where the first protrusion 53 of the rack gear 50 contacts the first cam surface 73A of the cam 70 to press the first cam surface 73A in accordance with the movement of the rack gear 50, the cam 70 moves in the direction away from the casing 11 in the axial direction. In FIGS. 8A through 8D, a portion indicated by hatching of dots represents a portion of the agitator gear 31 capable of meshing with the rack gear portion 52.

Figure 9A:
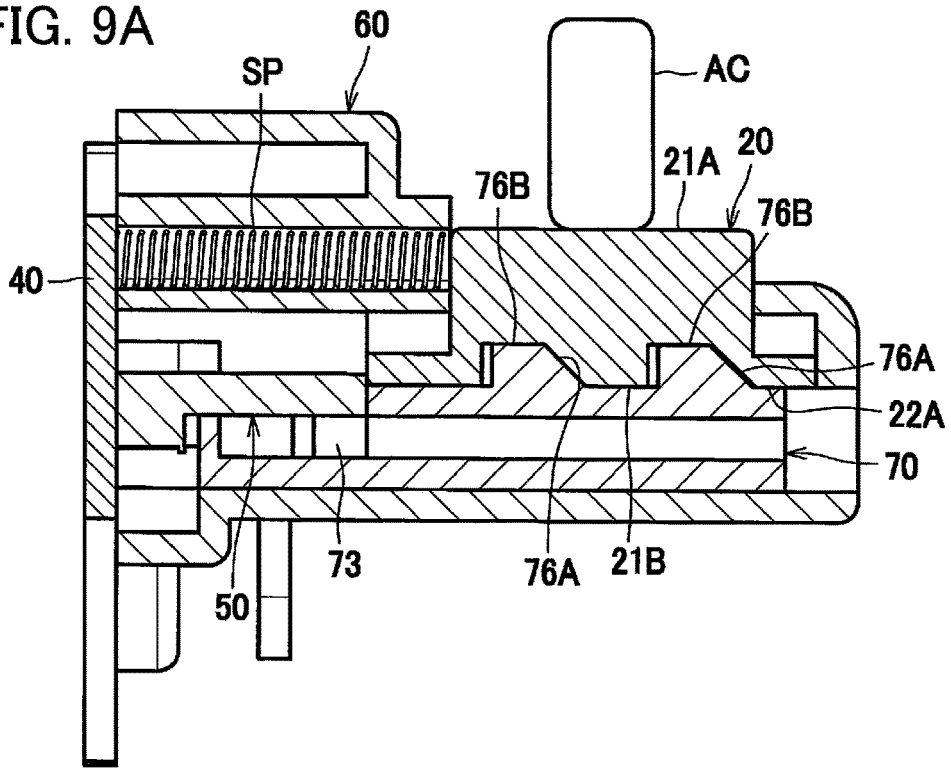
FIGS. 9A and 9B are cross-sectional views of the rack gear, the cam, and a developing electrode taken along a plane orthogonal to a direction from one end to the other end of a casing of the developing cartridge according to the first embodiment, illustrating movements of the rack gear, the cam, and the developing electrode.
Figure 9B:
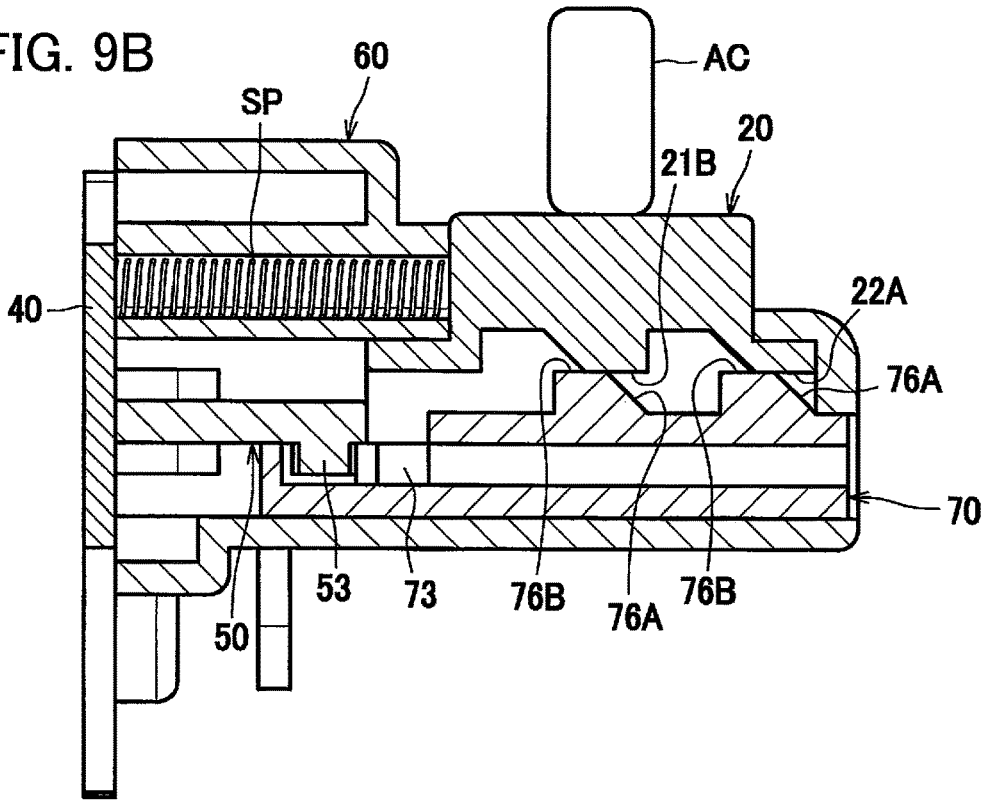

In a case where the cam 70 moves in the direction away from the casing 11 in the axial direction, as illustrated in the sequence of FIGS. 9A and 9B, the developing electrode 20 is pushed upward by each of the second cam surfaces 76A of the cam 70, and the developing electrode 20 moves from the third position to the fourth position. That is, the developing electrode 20 moves in the direction away from the cam 70, by receiving a force from the cam 70 moving in the direction away from the casing 11 in the axial direction.

In a case where the developing electrode 20 moves to the fourth position, the actuator AC is pushed upward by the developing electrode 20 and changed its position. That is, the cam 70 applies a force to the actuator AC through the developing electrode 20, thereby changing the position of the actuator AC in one direction. Accordingly, the optical sensor detects the change in position of the actuator AC in the one direction. A control device of the image forming apparatus can determine that the developing cartridge 1 is a brand-new cartridge, by detecting the change in position of the actuator AC using the optical sensor.

As illustrated in the sequence of FIGS. 8B and 8C, in a case where the rack gear 50 further moves in the direction from the one end E10 of the casing 11 toward the other end E20 of the casing 11, the cam 70 moves in the direction toward the casing 11 in the axial direction since the first protrusion 53 of the rack gear 50 presses the third cam surface 74A of the cam 70. Thus, as illustrated in the sequence of FIGS. 9B and 9A, the respective support surfaces 76B of the cam 70 are separated from the respective supported surfaces 21B and 22A of the developing electrode 20, and the developing electrode 20 moves from the fourth position to the third position. Incidentally, the movement of the developing electrode 20 from the fourth position to the third position may be achieved by gravity, or may be achieved by a spring that urges the actuator AC.

Thereafter, as illustrated in the sequence of FIGS. 8C and 8D, in a case where the rack gear 50 further moves in the direction from the one end E10 of the casing 11 toward the other end E20 of the casing 11, the second protrusion 54 of the rack gear 50 sequentially presses the respective cam surfaces 73A and 74A of the cam 70. As a result, the cam 70 moves in the direction away from the casing 11 in the axial direction, and then, moves in the direction toward the casing 11 in the axial direction. Therefore, in a case where the developing electrode 20 returns to the third position after the developing electrode 20 moves to the fourth position again, the optical sensor detects the change in position of the actuator AC in one direction. That is, in this embodiment, after the developing cartridge 1 in the brand-new state is attached to the main body casing of the image forming apparatus, the optical sensor detects the change in position of the actuator in one direction twice. This corresponds to the number of the protrusions 53 and 54 of the rack gear 50. For example, in a case where the rack gear 50 includes only one protrusion, the number of changes in position of the actuator in one direction detected by the optical sensor is one. Therefore, by setting the number of protrusions of the rack gear 50 in accordance with the specification of the developing cartridge 1 (for example, difference in an amount of toner accommodated in the developing cartridge 1), the control device can also determine the specification of the developing cartridge 1.

After the second protrusion 54 separates from the third cam surface 74A as illustrated in FIG. 8D, meshing between the rack gear 50 and the agitator gear 31 is released. As a result, the transmission of the driving force from the agitator gear 31 to the rack gear 50 is shut off, maintaining the developing electrode 20 at the third position.

According to the above, the following effects can be obtained in this embodiment.

Since the rack gear 50 moves in the direction from the one end E10 of the casing 11 toward the other end E20 of the casing 11, meshing between the rack gear 50 and the agitator gear 31 can be released.

Since the developing electrode 20 is formed of an electrically-conductive resin, the shape of the developing electrode 20 can be easily formed.

Second Embodiment

Next, a developing cartridge 101 according to a second embodiment will be described with reference to FIGS. 10 through 13B, wherein like parts and components are designated by the same reference numerals as those of the first embodiment to avoid duplicating description. In the following description, only parts differing from those of the above-described first embodiment will be described in detail.

Figure 10:
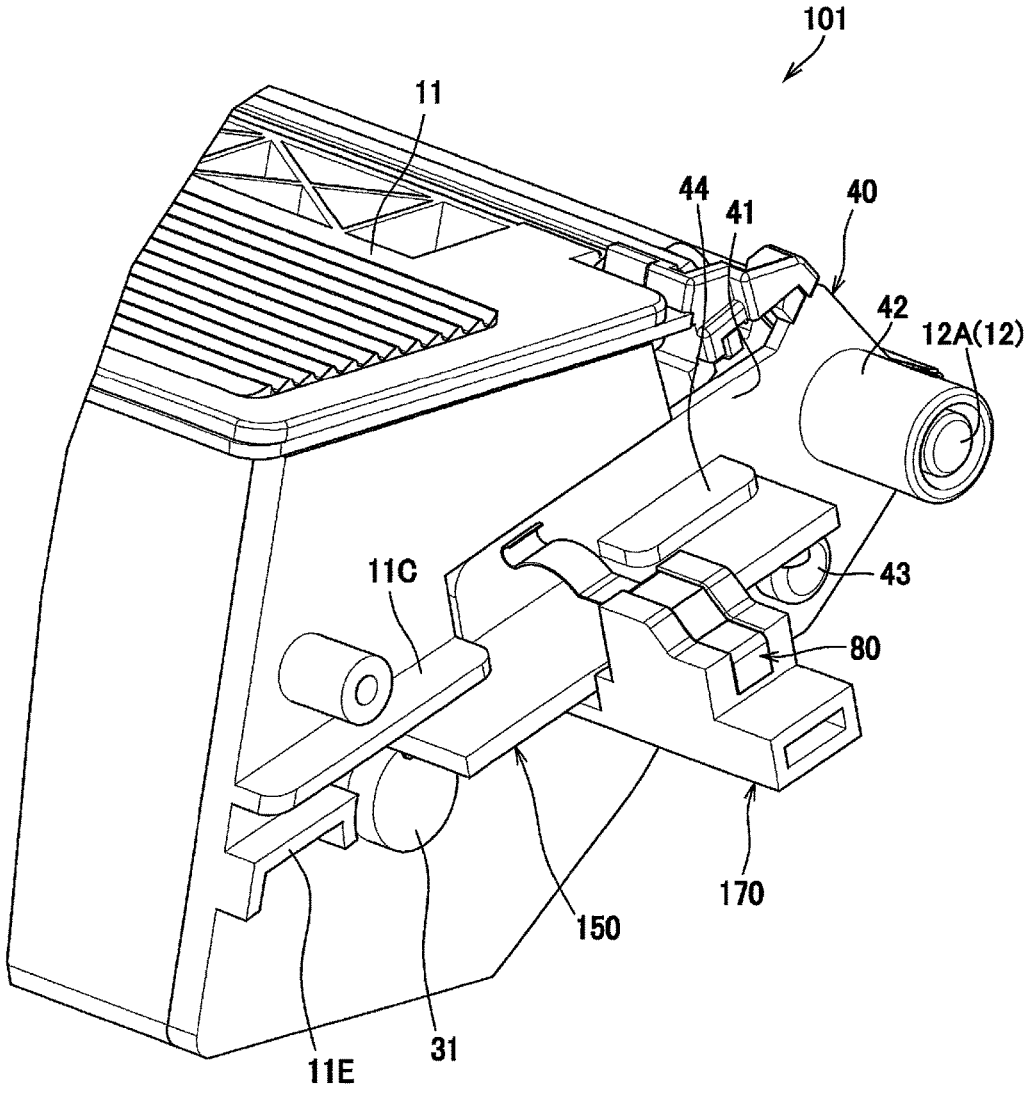
FIG. 10 is a perspective view illustrating a structure at the other end side of a developing cartridge according to a second embodiment, from which a gear cover is omitted.
Figure 11A:
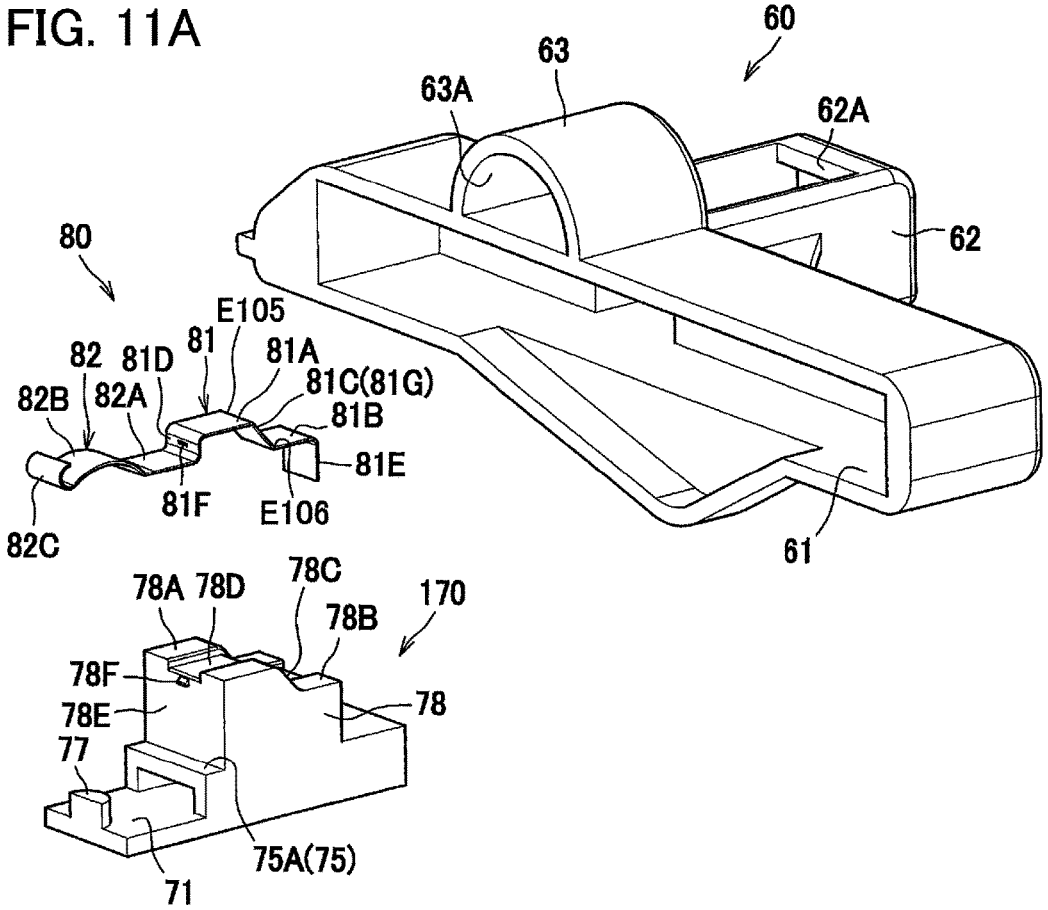

In the first embodiment, the compression coil spring SP is configured as a component separate from the developing electrode 20. However, in the second embodiment, a spring and the developing electrode 20 are integrally configured as illustrated in FIG. 10. Specifically, in the second embodiment, in addition to the casing 11, the agitator gear 31, and the bearing 40 similar to those of the first embodiment, the developing cartridge 101 includes a rack gear 150, a cam 170 and a spring electrode 80 different from those of the first embodiment. As illustrated in FIG. 11A, the cam 170 includes the base portion 71, the protruding portion 75, a protrusion 77, and a spring support portion 78. The protrusion 77 and the spring support portion 78 of the cam 170 are not included in the cam 70 according to the first embodiment, while the base portion 71 and the protruding portion 75 of the cam 170 are similar to those of the cam 70 according to the first embodiment.

The protrusion 77 protrudes toward the spring electrode 80 from the end portion of the base portion 71 closer to the casing 11. The protrusion 77 has a semi-circular columnar shape. A surface of the protrusion 77 farther from the casing 11 is an arcuate curved surface that protrudes in the direction away from the casing 11 in the axial direction.

The spring support portion 78 protrudes toward the spring electrode 80 from the first surface 75A of the protruding portion 75. The spring support portion 78 has a surface facing the spring electrode 80. The surface of the spring support portion 78 includes a first flat surface 78A, a second flat surface 78B, and an inclined surface 78C. The inclined surface 78C connects the first flat surface 78A and the second flat surface 78B. The first flat surface 78A and the second flat surface 78B extend parallel with the base portion 71. The first flat surface 78A is positioned farther from the base portion 71 than the second flat surface 78B is from the base portion 71. The first flat surface 78A is positioned closer to the casing 11 than the second flat surface 78B is to the casing 11. The inclined surface 78C extends from an edge of the first flat surface 78A farther from the casing 11. The inclined surface 78C is connected to an edge of the second flat surface 78B closer to the casing 11. The inclined surface 78C is inclined so that a downstream edge of the inclined surface 78C in the direction away from the casing 11 in the axial direction is positioned closer to the base portion 71 than an upstream edge of the inclined surface 78C in the direction away from the casing 11 in the axial direction is to the base portion 71.

The spring support portion 78 has a recessed portion 78D. The recessed portion 78D is recessed toward the base portion 71 in a center portion of each of the surfaces 78A, 78B, and 78C[in], *where the center portion of each of the surfaces 78A, 78B, 78C is defined relative to* the direction from the one end E10 of the casing 11 toward the other end E20 of the casing 11. The recessed portion 78D is positioned between an edge of the first flat surface 78A closer to the casing 11 and an edge of the second flat surface 78B farther from the casing 11. Further, the spring support portion 78 has a side surface 78E closer to the casing 11. The spring support portion 78 includes an engagement claw 78F positioned at the side surface 78E and protruding from the side surface 78E.

The through-hole 63A of the third cover portion 63 of the gear cover 60 is formed to have a size corresponding to the spring electrode 80.

The spring electrode 80 is made of an electrically-conductive material. The spring electrode 80 is electrically connected to the developing roller 12. The spring electrode 80 is movable together with the cam 170. The spring electrode 80 includes a developing electrode 81 and a spring 82. The developing electrode 81 has a shape in conformance with the shape of the spring support portion 78. The spring 82 is formed integrally with the developing electrode 81.

The developing electrode 81 includes a first plate-like portion 81A, a second plate-like portion 81B, a third plate-like portion 81C, a fourth plate-like portion 81D, and a fifth plate-like portion 81E. The first plate-like portion 81A and the second plate-like portion 81B extend parallel with the base portion 71. The third plate-like portion 81C connects the first plate-like portion 81A and the second plate-like portion 81B. The fourth plate-like portion 81D extends from an end of the first plate-like portion 81A closer to the casing 11 toward the base portion 71. The fifth plate-like portion 81E extends from an end of the second plate-like portion 81B farther from the casing 11 toward the base portion 71.

The first plate-like portion 81A, the second plate-like portion 81B, and the third plate-like portion 81C are received by the recessed portion 78D of the spring support portion 78 and are positioned at a bottom surface of the recessed portion 78D.

In a state where the first plate-like portion 81A is positioned at the bottom surface of the recessed portion 78D, a surface of the first plate-like portion 81A opposite to a surface thereof facing the cam 170 is flush with the first flat surface 78A of the spring support portion 78. In a state where the second plate-like portion 81B is positioned at the bottom surface of the recessed portion 78D, a surface of the second plate-like portion 81B opposite to a surface thereof facing the cam 170 is flush with the second flat surface 78B of the spring support portion 78. In a state where the third plate-like portion 81C is positioned at the bottom surface of the recessed portion 78D, a surface of the third plate-like portion 81C opposite to a surface thereof facing the cam 170 is flush with the inclined surface 78C of the spring support portion 78.

Alternatively, in a state where the first plate-like portion 81A is positioned at the bottom surface of the recessed portion 78D, the surface of the first plate-like portion 81A opposite to the surface thereof facing the cam 170 is positioned farther from the base portion 71 than the first flat surface 78A of the spring support portion 78. In a state where the second plate-like portion 81B is positioned at the bottom surface of the recessed portion 78D, the surface of the second plate-like portion 81B opposite to the surface thereof facing the cam 170 is positioned farther from the base portion 71 than the second flat surface 78B of the spring support portion 78. In a state where the third plate-like portion 81C is positioned at the bottom surface of the recessed portion 78D, the surface of the third plate-like portion 81C opposite to the surface thereof facing the cam 170 is positioned farther from the base portion 71 than the inclined surface 78C of the spring support portion 78. Further, the surface of the third plate-like portion 81C inclined relative to the axial direction and opposite to the surface thereof facing the cam 170 serves as a second cam surface 81G.

The second cam surface 81G has a fifth edge E105, and a sixth edge E106. The sixth edge E106 is positioned farther away from the casing 11 than the fifth edge E105 is from the casing 11 in the axial direction. The second cam surface 81G is inclined so as to protrude toward the opening 62A in a direction from the sixth edge E106 toward the fifth edge E105.

The fourth plate-like portion 81D and the fifth plate-like portion 81E interpose the spring support portion 78 therebetween in the axial direction. An engagement hole 81F engages with the engagement claw 78F of the spring support portion 78. The fourth plate-like portion 81D has the engagement hole 81F.

The spring 82 includes a flat plate-like portion 82A, a first curved portion 82B, and a second curved portion 82C. The flat plate-like portion 82A extends parallel with the first plate-like portion 81A. The first curved portion 82B is curved so as to protrude away from the cam 170. The second curved portion 82C is curved so as to protrude toward the casing 11. The flat plate-like portion 82A extends toward the casing 11 from an end of the fourth plate-like portion 81D closer to the cam 170. The first curved portion 82B is connected to an end of the flat plate-like portion 82A closer to the casing 11. The second curved portion 82C extends from an end of the first curved portion 82B closer to the casing 11 in a direction away from the cam 170.

Figure 13A:
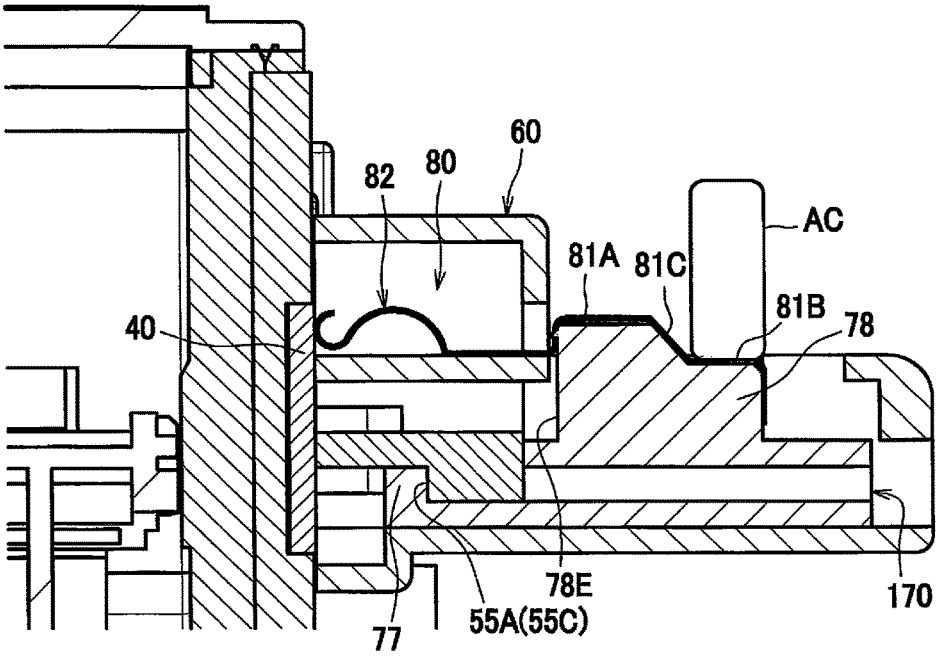
FIGS. 13A and 13B are cross-sectional views of the rack gear, the cam, and a spring electrode taken along a plane orthogonal to a direction from one end to the other end of a casing of the developing cartridge according to the second embodiment, illustrating movements of the rack gear, the cam, and the spring electrode.

As illustrated in FIG. 13A, the spring 82 is positioned between the side surface 78E of the spring support portion 78 and the bearing 40. An end of the spring 82 closer to the casing 11 is in contact with the bearing 40. The spring 82 urges the cam 170 in the direction away from the casing 11 in the axial direction in a state where the cam 170 is at its initial position (i.e. the position illustrated in FIG. 13A). That is, the spring 82 urges the cam 170 from the initial position as an example of a first position toward an outside position as an example of a second position.

Figure 11B:
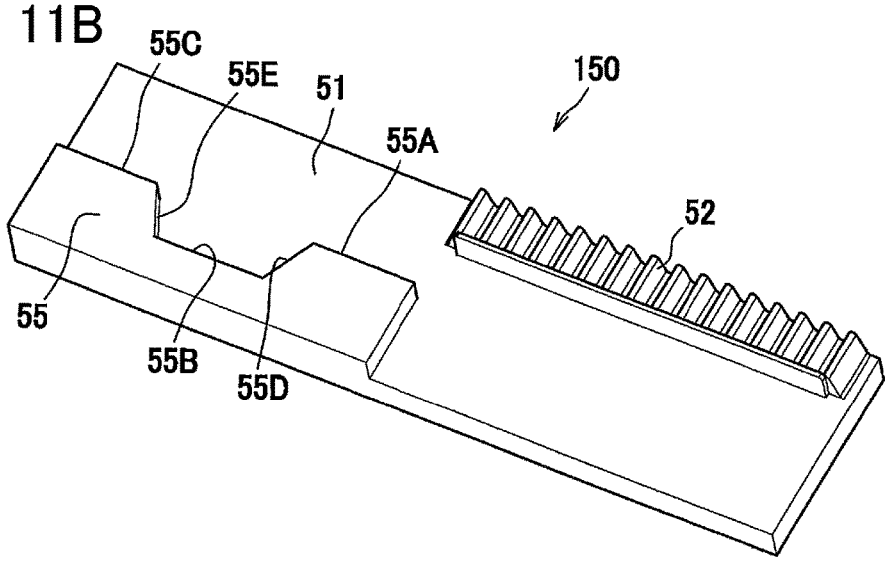

As illustrated in FIG. 11B, the rack gear 150 includes the main body portion 51, the rack gear portion 52, and a cam portion 55. The cam portion 55 is not included in the rack gear 50 according to the first embodiment, while the main body portion 51 and the rack gear portion 52 of the rack gear 150 are similar to those of the rack gear 50 according to the first embodiment. The cam portion 55 is positioned at an upstream portion of the rack gear 150 in a moving direction of the rack gear 150 in an end portion of the main body portion 51 farther from the casing 11 in the axial direction. In the following description, "upstream in the moving direction of the rack gear" and "downstream in the moving direction of the rack gear" will also be simply referred to as "upstream" and "downstream", respectively.

The cam portion 55 protrudes from the main body portion 51. A surface of the cam portion 55 closer to the casing 11 includes a first holding surface 55A, a second holding surface 55B, a third holding surface 55C, a connecting surface 55D, and a cam surface 55E. The first holding surface 55A, the second holding surface 55B, and the third holding surface 55C are planer surfaces orthogonal to the axial direction. The connecting surface 55D connects the first holding surface 55A and the second holding surface 55B. The cam surface 55E connects the second holding surface 55B and the third holding surface 55C.

The first holding surface 55A and the third holding surface 55C are positioned at positions the same as each other in the axial direction. The first holding surface 55A is positioned downstream relative to the third holding surface 55C. The first holding surface 55A and the third holding surface 55C come into contact with the protrusion 77 to hold the cam 170 at the initial position (first position).

The second holding surface 55B is positioned between the first holding surface 55A and the third holding surface 55C in the moving direction of the rack gear 150. The second holding surface 55B is positioned farther away from the casing 11 than the first holding surface 55A is from the casing 11 (see FIG. 12A). The second holding surface 55B comes into contact with the protrusion 77 to hold the cam 170 at the outside position (second position).

The connecting surface 55D extends from an upstream edge of the first holding surface 55A and is connected to a downstream edge of the second holding surface 55B. The connecting surface 55D is inclined so that an upstream edge of the connecting surface 55D is positioned farther away from the casing 11 than a downstream edge of the connecting surface 55D is from the casing 11.

The cam surface 55E is inclined relative to the moving direction of the rack gear 150. Specifically, the cam surface 55E extends from an upstream edge of the second holding surface 55B and is connected to a downstream edge of the third holding surface 55C. The cam surface 55E is inclined so that an upstream edge of the cam surface 55E is positioned closer to the casing 11 than a downstream edge of the cam surface 55E is to the casing 11.

Figure 12C:
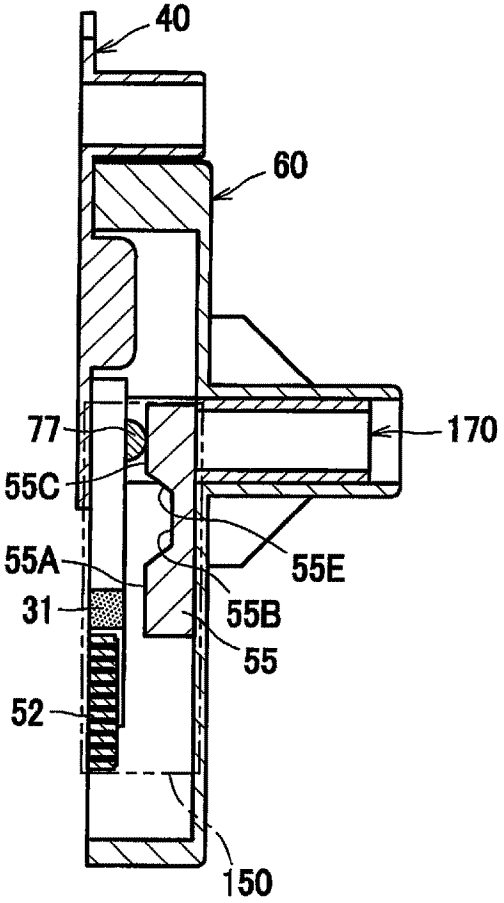
FIGS. 12A through 12C are cross-sectional views of an engaging portion between the rack gear and a cam taken along a plane orthogonal to the up-down direction according to the second embodiment, illustrating movements of the rack gear and the cam.
Figure 12B:
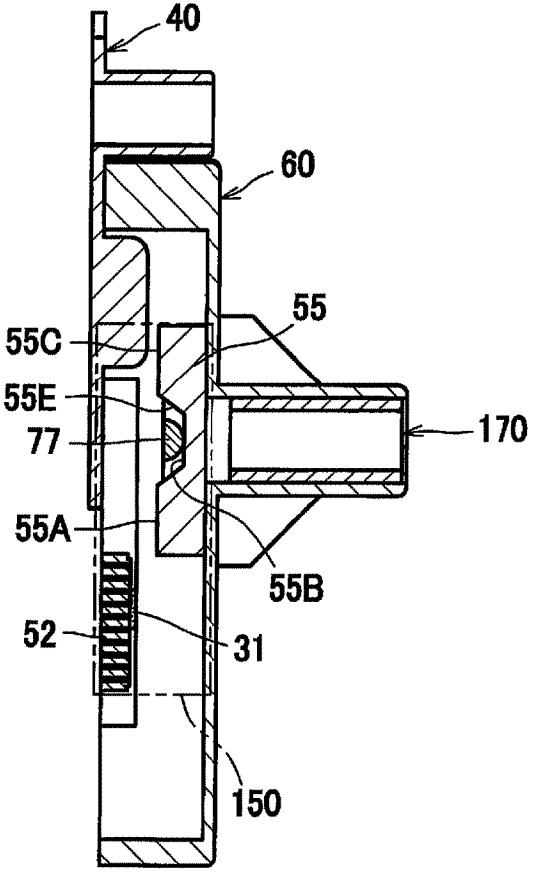
Figure 12A:
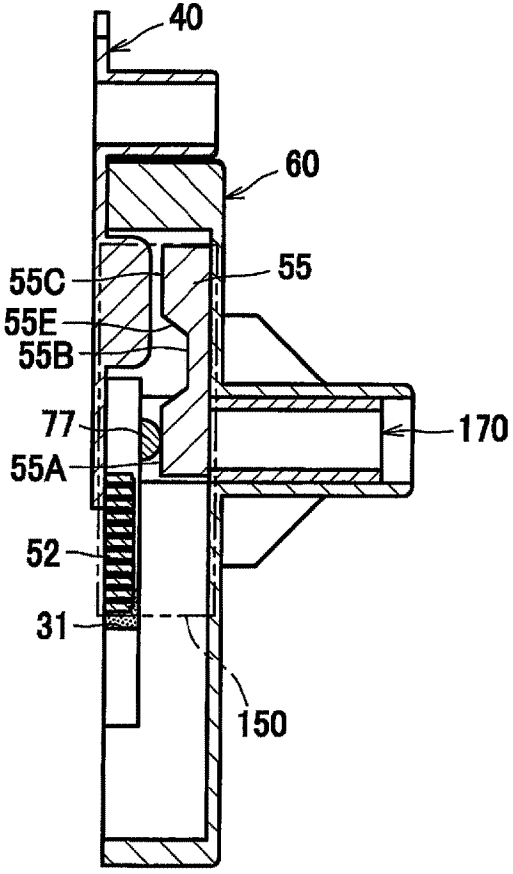

In this embodiment, as illustrated in FIG. 12A, in a case where the developing cartridge 1 is in a brand-new state, the cam 170 is at its initial position since the protrusion 77 of the cam 170 is supported at the first holding surface 55A of the rack gear 150. Specifically, an urging force applied to the cam 170 from the spring electrode 80 is received by the first holding surface 55A.

In a case where the developing cartridge 1 is attached to the main body casing of the image forming apparatus in a state where the cam 170 is at the initial position, the actuator AC is pushed by the second plate-like portion 81B of the spring electrode 80 supported at the cam 170 as illustrated in FIG. 13A. As a result, the actuator AC swingably moves from a first posture to a second posture. The optical sensor detects the change in posture of the actuator AC. At this time, the electrode of the actuator AC and the spring electrode 80 are electrically connected to each other.

Thereafter, as illustrated in the sequence of FIGS. 12A and 12B, in a case where the driving force is transmitted to the agitator gear 31, the rack gear 150 moves in the direction from the one end E10 of the casing 11 toward the other end E20 of the casing 11. In a case where the first holding surface 55A separates from the protrusion 77 in accordance with the movement of the rack gear 150, the cam 170 moves in the direction away from the casing 11 in the axial direction due to the urging force of the spring electrode 80. Thereafter, in a case where the protrusion 77 comes into contact with the second holding surface 55B, the movement of the cam 170 is stopped, and the cam 170 is placed at the outside position farther away from the casing 11 than the initial position from the casing 11.

Figure 13B:
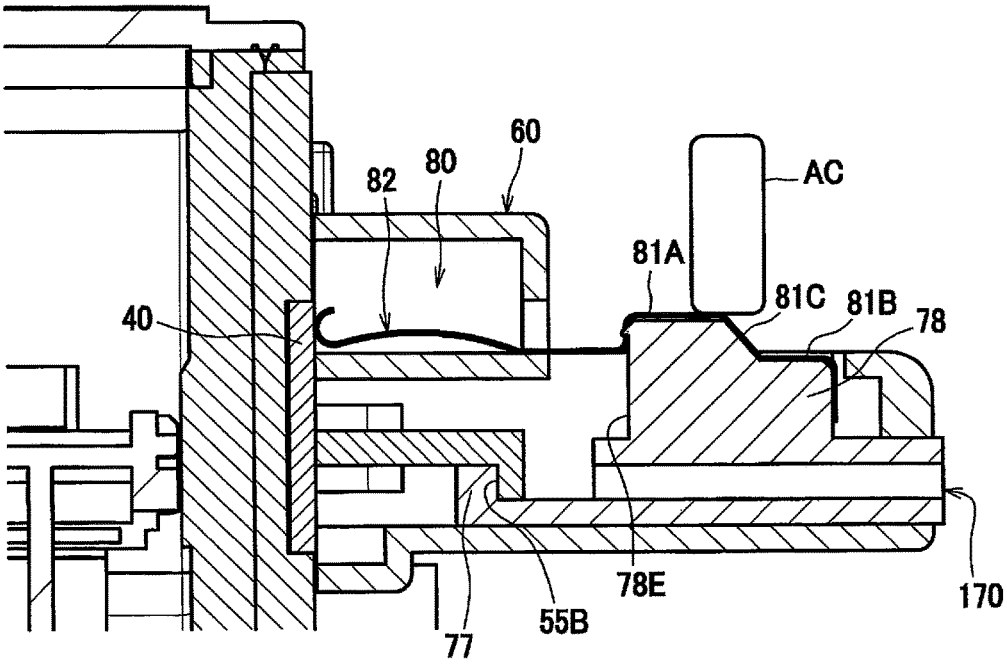

While the cam 170 moves from the initial position to the outside position, the actuator AC is pushed by the inclined third plate-like portion 81C of the spring electrode 80 supported at the cam 170 as illustrated in FIG. 13B. As a result, the actuator AC swingably moves from the second posture to a third posture, and the optical sensor detects the change in posture of the actuator AC.

Thereafter, as illustrated in the sequence of FIGS. 12B and 12C, in a case where the rack gear 150 further moves in the direction from the one end E10 of the casing 11 toward the other end E20 of the casing 11, the cam 170 returns to the initial position from the outside position since the protrusion 77 is pushed by the cam surface 55E of the rack gear 150 in the direction toward the casing 11 in the axial direction against the urging force of the spring electrode 80. As a result, the actuator AC swingably moves from the third posture to the second posture as illustrated in FIG. 13A, and the optical sensor detects the change in posture of the actuator AC.

As described above, in the second embodiment, similarly to the first embodiment, meshing between the rack gear 150 and the agitator gear 31 can be released since the rack gear 150 moves in the direction from the one end E10 of the casing 11 toward the other end E20 of the casing 11. Further, in the second embodiment, since the spring 82 and the developing electrode 81 are configured as a single component (spring electrode 80), the number of components can be reduced. The spring and the developing electrode may be separate components. Further, the spring as a separate component may be a coil spring or a wire spring.

<Modifications>

While the description has been made in detail with reference to the embodiments thereof, it would be apparent to those skilled in the art that many modifications and variations may be made therein without departing from the scope of the disclosure.

In the first embodiment, the fourth cam surfaces 24A are provided at the developing electrode 20, and the second cam surfaces 76A are provided at the cam 70. However, for example, a protrusion engaging with the second cam surface of the cam may be provided at the developing electrode.

In the first embodiment, the rack gear 50 in its entirety is covered with the gear cover 60. However, the gear cover may cover a portion of the rack gear and may expose the remaining portion of the rack gear to outside.

In the first and second embodiments, the agitator gear 31 is exemplified as an example of a gear. However, any gears other than the agitator gear 31 may be available.

In the first and second embodiment, the compression coil spring SP and the spring 82 are exemplified as a spring. However, the spring may be, for example, a wire spring or a torsion spring.

In the first embodiment, the cam 70 is movably supported at the gear cover 60. However, the cam may be movably supported at the casing.

Further, the respective elements described in the above embodiments and modifications may be arbitrarily combined and implemented.

What is claimed is:

1. A developing cartridge comprising:

a casing configured to accommodate toner therein;

a developing roller rotatable about a first axis extending in an axial direction, the developing roller being positioned at one end of the casing;

a developing electrode electrically connected to the developing roller;

a gear rotatable about a second axis parallel with the first axis;

a rack gear meshing with the gear, the rack gear being movable in a direction from the one end of the casing toward another end of the casing opposite to the one end of the casing, the rack gear including a protrusion; and a cam movable from a first position to a second position, the second position being farther away from the casing than the first position is from the casing in the axial direction, the cam having:

a first cam surface contacting the protrusion in a case where the cam is at the first position, the first cam surface causing the cam to move from the first position to the second position in a case where the rack gear moves in the direction from the one end of the casing toward the another end of the casing in a state where the first cam surface is in contact with the protrusion; and a second cam surface moving the developing electrode in a direction away from the cam while contacting the developing electrode in a case where the cam moves from the first position to the second position, the direction away from the cam being a direction different from a moving direction of the rack gear and a moving direction of the cam.

2. The developing cartridge according to claim 1, further comprising a spring for electrically connecting the developing electrode to the developing roller.

3. The developing cartridge according to claim 2, further comprising a bearing for supporting the developing roller, wherein the spring has:

one end in contact with the developing electrode; and another end opposite to the one end of the spring, the another end being in contact with the bearing.

4. The developing cartridge according to claim 3, wherein, in a state where the one end of the spring is in contact with the developing electrode and the another end of the spring is in contact with the bearing, the spring has a length smaller than a natural length of the spring.

5. The developing cartridge according to claim 3, wherein the bearing is made of an electrically-conductive resin.

6. The developing cartridge according to claim 1, wherein the developing electrode is made of an electrically-conductive resin.

7. The developing cartridge according to claim 1, wherein the first cam surface has:

a first edge; and a second edge positioned farther away from the casing than the first edge is from the casing in the axial direction, and wherein the first cam surface is inclined so that the first edge is positioned downstream relative to the second edge in the moving direction of the rack gear.

8. The developing cartridge according to claim 1, wherein the cam has a third cam surface positioned downstream relative to the first cam surface in the moving direction of the rack gear, the third cam surface contacting the protrusion in a case where the cam is at the second position, and wherein the third cam surface causes the cam to move from the second position to the first position in a case where the rack gear moves in the direction from the one end of the casing toward the another end of the casing in a state where the third cam surface is in contact with the protrusion.

9. The developing cartridge according to claim 8, wherein the third cam surface has:

a [third] *first* edge; and a [fourth] *second* edge positioned farther away from the casing than the [third] *first* edge is from the casing in the axial direction, and wherein the third cam surface is inclined so that the [fourth] *second* edge *of the third cam surface* is positioned downstream relative to the [third] *first* edge *of the third cam surface* in the moving direction of the rack gear.

10. The developing cartridge according to claim 8, wherein the first cam surface is positioned at a position different from the third cam surface in the moving direction of the cam.

11. The developing cartridge according to claim 1, further comprising:

an agitator configured to agitate toner accommodated in the casing; and an agitator gear mounted to an end portion of the agitator and rotatable together with the agitator, wherein the agitator gear serves as the gear.

12. The developing cartridge according to claim 1, further comprising a coupling positioned opposite to the developing electrode relative to the casing.

13. The developing cartridge according to claim 1, wherein the developing gear has a [fourth] *further* cam surface contacting the second cam surface and extending parallel with the second cam surface.

14. The developing cartridge according to claim 1, wherein the rack gear includes:

a main body portion having a plate shape and extending in the moving direction of the rack gear; and a plurality of gear teeth meshing with the gear, and wherein the plurality of gear teeth and the protrusion protrude from the main body portion and are positioned at positions different from each other in the moving direction of the rack gear.

15. The developing cartridge according to claim 14, wherein the protrusion is positioned at a position different from the plurality of gear teeth in the axial direction.

16. The developing cartridge according to claim 1, wherein the second cam surface has:

a [fifth] *first* edge; and a [sixth] *second* edge positioned farther away from the casing than the [fifth] *first* edge *of the second cam surface* is from the casing in the axial direction, and wherein the second cam surface is inclined so as to protrude toward the developing electrode in a direction from the [sixth] *second* edge *of the second cam surface* toward the [fifth] *first* edge *of the second cam surface*.

17. A developing cartridge comprising:

a casing configured to accommodate toner therein;

a developing roller rotatable about a first axis extending in an axial direction, the developing roller being positioned at one end of the casing;

a gear rotatable about a second axis extending in the axial direction;

a developing electrode electrically connected to the developing roller;

a rack gear [movable from the one end of the casing toward another end of the casing opposite to the one end of the casing, the rack gear being] movable in a direction from the one end of the casing toward [the] another end of the casing in accordance with rotation of the gear by meshing with the gear, the rack gear including a protrusion;

a cover covering at least a portion of the rack gear, the cover having an opening through which the developing electrode is exposed to an outside; and a cam movable from a first position to a second position, the second position being farther away from the casing than the first position is from the casing in the axial direction, the cam having:

a first cam surface having a first edge and a second edge, the second edge being positioned farther away from the casing than the first edge is from the casing in the axial direction, the first cam surface being inclined so that the first edge is positioned downstream relative to the second edge in a moving direction of the protrusion, the first cam surface causing the cam to move from the first position to the second position by engaging with the protrusion, the first cam surface being positioned outside of a movement locus of the protrusion in a case where the cam is at the second position; and a second cam surface movable together with the first cam surface, the second cam surface being positioned farther away from the casing than the first cam surface is from the casing in the axial direction, the second cam surface being movable while contacting the developing electrode, the second cam surface having a [fifth] *first* edge and a [sixth] *second* edge, the [sixth] *second* edge of *the second cam surface* being positioned farther away from the casing than the [fifth] *first* edge *of the second cam surface* is from the casing in the axial direction, the second cam surface being inclined so as to protrude toward the opening in a direction from the [sixth] *second* edge *of the second cam surface* toward the [fifth] *first* edge *of the second cam surface*.

18. The developing cartridge according to claim 17, further comprising a spring for electrically connecting the developing electrode to the developing roller.

19. The developing cartridge according to claim 17, wherein the cam further includes a third cam surface positioned downstream relative to the first cam surface in a moving direction of the rack gear, the third cam surface being positioned within the movement locus of the protrusion in a case where the cam is at the second position, wherein the third cam surface has:

a [third] *first* edge; and a [fourth] *second* edge positioned farther away from the casing than the [third] *first* edge *of the third cam surface* is from the casing in the axial direction, and wherein the third cam surface is inclined so that the [fourth] *second* edge *of the third cam surface* is positioned downstream relative to the [third] *first* edge *of the third cam surface* in the moving direction of the rack gear.

20. A developing cartridge comprising:

a casing configured to accommodate toner therein;

a developing roller rotatable about a first axis extending in an axial direction, the developing roller being positioned at one end of the casing;

a gear rotatable about a second axis parallel with the first axis;

a rack gear meshing with the gear, the rack gear being movable in a direction from the one end of the casing toward another end of the casing opposite to the one end of the casing;

a cam movable from a first position to a second position, the second position being farther away from the casing than the first position is from the casing in the axial direction, the cam including a protrusion;

a spring urging the cam from the first position toward the second position;

a cover having an opening; and a developing electrode electrically connected to the developing roller, the developing electrode being movable together with the cam, the developing electrode having a [second] cam surface, the [second] cam surface having a [fifth] *first* edge and a [sixth] *second* edge, the [sixth] *second* edge being positioned farther away from the casing than the [fifth] *first* edge is from the casing in the axial direction, the [second] cam surface being inclined so as to protrude toward the opening in a direction from the [sixth] *second* edge toward the [fifth] *first* edge, the rack gear having:

a first holding surface contacting the protrusion to hold the cam at the first position; and a second holding surface contacting the protrusion to hold the cam at the second position.

21. The developing cartridge according to claim 20, wherein the developing electrode is formed integrally with the spring.

*22. A developing cartridge comprising:*

*a casing configured to accommodate toner therein;*

*a developing roller rotatable about a first axis extending in an axial direction, the developing roller being positioned at a first end of the casing;*

*a developing electrode electrically connected to the developing roller;*

*a gear rotatable about a second axis parallel with the first axis;*

*a rack gear meshing with the gear, the rack gear being movable in a direction extending between the first end of the casing and a second end of the casing opposite to the first end of the casing, the rack gear including a protrusion; and*

*a cam movable between a first position and a second position, the cam having:*

*a first cam surface configured to engage the protrusion to selectively move the cam between the first and second positions in response to movement of the rack gear.*

*23. The developing cartridge according to claim 22, wherein the rack gear is movable in a direction extending from the first end of the casing to the second end of the casing to move the cam from the first position to the second position.*

*24. The developing cartridge according to claim 22, wherein the cam further includes a second cam surface that moves the developing electrode in a direction away from the cam in response to the movement of the cam from the first position to the second position.*

*25. The developing cartridge according to claim 22, wherein the second position is farther away from the casing than the first position is from the casing in the axial direction.*

*26. The developing cartridge according to claim 22, wherein the cam is configured to move the developing electrode in a direction away from the cam in response to the movement of the cam from the first position to the second position, the direction away from the cam being a direction different from a moving direction of the rack gear and a moving direction of the cam.*

*27. A developing cartridge comprising:*

*a casing configured to accommodate toner therein;*

*a developing roller rotatable about a first axis extending in an axial direction, the developing roller being positioned at a first end of the casing;*

*a developing electrode electrically connected to the developing roller;*

*a gear rotatable about a second axis parallel with the first axis;*

*a rack gear meshing with the gear, the rack gear including a protrusion; and*

*a cam movable from a first position to a second position, the cam having a first cam surface contacting the protrusion in a case where the cam is at the first position, the first cam surface causing the cam to move from the first position to the second position in a case where the rack gear moves in a direction extending between the first end of the casing and a second end of the casing opposite to the first end of the casing.*

*28. The developing cartridge according to claim 27, wherein the protrusion contacts the first cam surface as the rack gear moves in the direction extending from the first end of the casing toward the second end of the casing.*

*29. The developing cartridge according to claim 27, wherein the second position is farther away from the casing than the first position is from the casing in the axial direction.*

*30. The developing cartridge according to claim 27, wherein the cam further includes a second cam surface moving the developing electrode in a direction away from the cam while contacting the developing electrode in a case where the cam moves from the first position to the second position, the direction away from the cam being a direction different from a moving direction of the rack gear and a moving direction of the cam.*

*31. A developing cartridge comprising:*

*a casing configured to accommodate toner therein;*

*a developing roller rotatable about a first axis extending in an axial direction, the developing roller being positioned at one end of the casing;*

*a developing electrode electrically connected to the developing roller;*

*a gear rotatable about a second axis parallel with the first axis;*

*a rack gear meshing with the gear and being movable in a direction extending between the one end of the casing and another end of the casing opposite the one end of the casing; and*

*a cam movable from a first position to a second position, the cam being movable from the first position to the second position to move the developing electrode in a case where the rack gear moves in the direction extending between the one end of the casing and the another end of the casing opposite to the one end of the casing.*

*32. The developing cartridge according to claim 31, wherein the rack gear includes a protrusion and the cam includes a cam surface, the cam surface being contacted by the protrusion to cause the cam to move from the first position to the second position in a case where the rack gear moves in the direction between the one end of the casing and the another end of the casing opposite to the one end of the casing.*

*33. The developing cartridge according to claim 32, wherein the cam surface moves the developing electrode in a direction away from the cam in a case where the cam moves from the first position to the second position.*

*34. The developing cartridge according to claim 31, wherein the second position is farther away from the casing than the first position is from the casing in the axial direction.*

*35. The developing cartridge according to claim 31, wherein the cam further includes a cam surface configured to move the developing electrode in a direction away from the cam while contacting the developing electrode in a case where the cam moves from the first position to the second position, the direction away from the cam being a direction different from a moving direction of the rack gear and a moving direction of the cam.*

* * * * *